(12) United States Patent
Kobayashi

(10) Patent No.: US 9,930,202 B2
(45) Date of Patent: Mar. 27, 2018

(54) INFORMATION PROCESSING APPARATUS ENSURING TEMPORAL MATCHING WITH SERVER, METHOD OF CONTROLLING THE INFORMATION PROCESSING APPARATUS, INFORMATION PROCESSING SYSTEM, AND STORAGE MEDIUM

(71) Applicant: CANON KABUSHIKI KAISHA, Tokyo (JP)

(72) Inventor: Norihiko Kobayashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/358,731

(22) Filed: Nov. 22, 2016

(65) Prior Publication Data

US 2017/0155788 A1 Jun. 1, 2017

(30) Foreign Application Priority Data

Nov. 27, 2015 (JP) ................................ 2015-231954

(51) Int. Cl.
*H04N 1/00* (2006.01)
*H04N 1/327* (2006.01)

(52) U.S. Cl.
CPC ..... *H04N 1/00933* (2013.01); *H04N 1/00344* (2013.01); *H04N 1/00347* (2013.01); *H04N 1/32765* (2013.01); *H04N 2201/0094* (2013.01)

(58) Field of Classification Search
CPC .................................................. H04N 1/00933

USPC ......................................................... 358/1.15
See application file for complete search history.

(56) References Cited

U.S. PATENT DOCUMENTS

2012/0078389 A1* 3/2012 Hashimoto ........... G06F 1/3209
700/22
2014/0192624 A1* 7/2014 Ono ....................... G04R 20/18
368/46

FOREIGN PATENT DOCUMENTS

JP 2005117338 A 4/2005
JP 2011070636 A 4/2011

* cited by examiner

*Primary Examiner* — Jacky X Zheng
(74) *Attorney, Agent, or Firm* — Rossi, Kimms & McDowell LLP

(57) ABSTRACT

An information processing apparatus which, even when a clock time is changed therein during a time period over which communication with a server is disabled, is capable of ensuring temporal matching with the server after the communication is resumed. The information processing apparatus (MFP) notifies notification date-and-time information to the server when predetermined processing is performed. The MFP manages a time difference which is a difference between a time defined based on the notification date-and-time information and a time indicated by a clock of the MFP, and calculates an amount of change in the clock time in the case where the clock time is changed. When the clock time is changed, the MFP calculates a calculation time based on the time difference and the amount of change, and notifies the calculation time as the notification date-and-time information to the server.

11 Claims, 24 Drawing Sheets

*FIG. 8*

| ID | IDENTIFIER | NAME | DATE-AND-TIME CORRECTION VALUE |
|---|---|---|---|
| 0001 | xyz123 | MFP110a | 00:10 |
| 0002 | xyz456 | MFP110b | -00:10 |

FIG. 14A

| ID | ADDRESS NAME | ADDRESS | LAST DATA ACQUISITION DATE AND TIME |
|---|---|---|---|
| 0001 | AddressA | a@a | 2015/1/1 12:10 |

FIG. 14B

| ID | ADDRESS NAME | ADDRESS | LAST DATA ACQUISITION DATE AND TIME |
|---|---|---|---|
| 0001 | AddressA | a@a | 2015/1/1 12:11 |

FIG. 14C

| ID | ADDRESS NAME | ADDRESS | LAST DATA ACQUISITION DATE AND TIME | DATA UPDATE DATE AND TIME |
|---|---|---|---|---|
| 0001 | AddressA | a@a | 2015/1/1 11:00 | 2015/1/1 11:01 |

FIG. 16

| TIME COUNTER | TIME INFORMATION |
|---|---|
| 1000 | 2015/1/2 8:00 |

FIG. 17

| TIME COUNTER | TIME INFORMATION |
|---|---|
| 4600 | 2015/1/2 9:30 |

FIG. 18

| TIME CHANGE AMOUNT |
|---|
| 0:30 |

FIG. 21

| ID | IDENTIFIER | NAME | DATE-AND-TIME CORRECTION VALUE |
|---|---|---|---|
| 0001 | xyz123 | MFP110a | 01:00 |
| 0002 | xyz456 | MFP110b | -00:10 |

FIG. 22

| SERVER TIME | MFP TIME | CONTENTS OF PROCESSING | OUTLINE OF CHANGES | TIME DIFFERENCE |
|---|---|---|---|---|
| 9:00 | 10:00 | SERVER STOPPAGE | | |
| 9:10 | 10:10 | VALUE CHANGE | 10:10 ID0001. AddressA a@a | 0:00 |
| 9:20 | 10:40 | TIME CHANGE | TIME CHANGE FROM 10:20 TO 10:40 | 0:20 |
| 9:30 | 10:50 | RESTART | | |
| 9:40 | 11:00 | VALUE CHANGE | 11:00 ID0002. AddressB b@b | 0:20 |
| 9:50 | 11:40 | TIME CHANGE | TIME CHANGE FROM 11:10 TO 11:40 | 0:50 |
| 10:00 | 11:50 | SERVER RECOVERY | | |

FIG. 23

| SERVER TIME | DATE-AND-TIME CORRECTION VALUE | MFP TIME IDENTIFIED BY SERVER | NOTIFICATION DATE-AND-TIME INFORMATION NOTIFIED TO SERVER | MFP TIME (TRANSMISSION TIME) | TIME CONTAINED IN JOB (GENERATION TIME) | TIME DIFFERENCE | |
|---|---|---|---|---|---|---|---|
| | | | | | | BEFORE CHANGE | AFTER CHANGE |
| 10:10 | 1:00 | 11:10 | | 12:00 | 10:10 | 0:50 | |
| 10:20 | 1:20 | 11:40 | 11:40 | 12:10 | | 0:50 | 0:30 |
| 10:30 | 1:20 | 11:50 | | 12:20 | 11:00 | 0:30 | |
| 10:40 | 1:50 | 12:30 | 12:30 | 12:30 | | 0:30 | 0:00 |

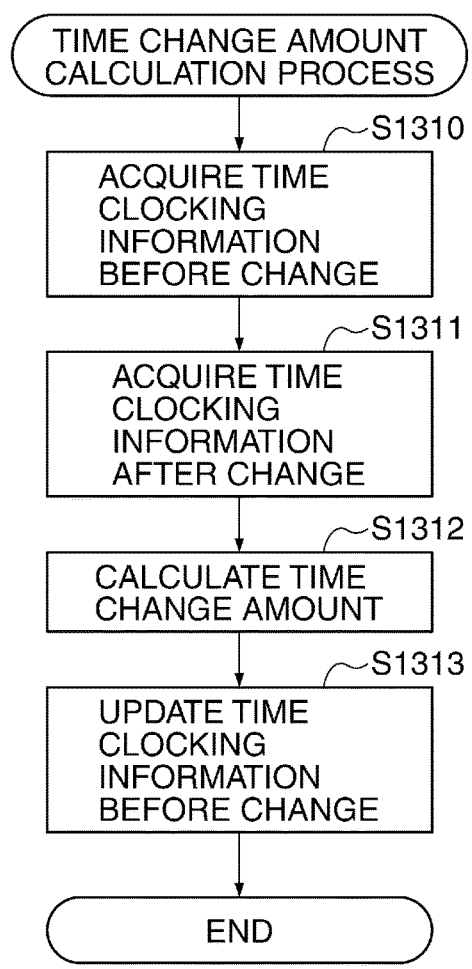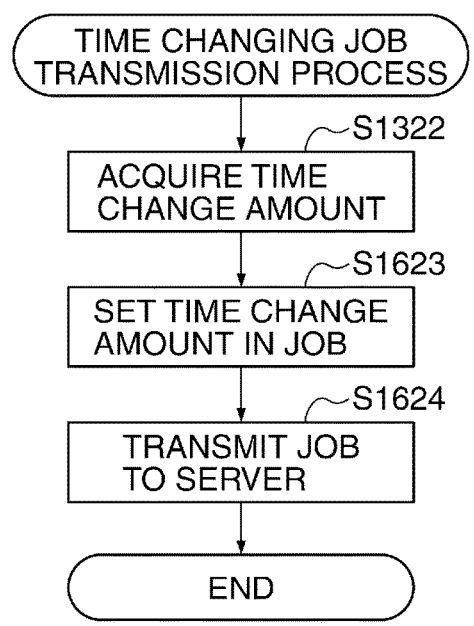
FIG. 24B
FIG. 24C

FIG. 27

| ID | IDENTIFIER | NAME | DATE-AND-TIME CORRECTION VALUE |
|---|---|---|---|
| 0001 | xyz123 | MFP110a | 02:00 |
| 0002 | xyz456 | MFP110b | -00:10 |

INFORMATION PROCESSING APPARATUS ENSURING TEMPORAL MATCHING WITH SERVER, METHOD OF CONTROLLING THE INFORMATION PROCESSING APPARATUS, INFORMATION PROCESSING SYSTEM, AND STORAGE MEDIUM

BACKGROUND OF THE INVENTION

Field of the Invention

The present invention relates to a technique for synchronization processing performed between a server and an information processing apparatus.

Description of the Related Art

Conventionally, as an information processing system including information processing apparatuses, such as an image forming apparatus, there has been known a system in which data under management is synchronized via a network. A system of this type employs a technique in which one information processing apparatus transmits respective contents of changes in data items under its management to another information processing apparatus in an order in which the data items were changed, and the information processing apparatus on the receiving side causes the changes to be reflected on data items under its management in the order of data reception to thereby maintain matching of the order of changes in the data items (see Japanese Patent Laid-Open Publication No. 2011-70636).

Further, there has been known a method in which the matching of the order of changes is maintained by adding date-and-time information of each change to an associated one of the respective contents of the changes, and corresponding data items are processed in the order of date and time. In this method, it is assumed that information processing apparatuses in an information processing system have respective clocks matching each other. In view of this, there has been proposed a technique in which when the clock of one of the information processing apparatuses do not match the clock of another, date-and-time information of data is corrected by correcting the date-and-time information before data exchange (see Japanese Patent Laid-Open Publication No. 2005-117338).

However, in the related art, a case where the same data is changed by a plurality of information processing apparatuses or a case where a clock time of an information processing apparatus is changed is not taken into account. For this reason, when a clock time of an information processing apparatus is changed in a state where the information processing apparatus cannot be connected to a server, it is impossible to properly synchronize setting information or the like between the server and the information processing apparatus, while maintaining the order of time changes. In particular, in the case where the time of the clock is changed a plurality of times in the information processing apparatus in a state where the information processing apparatus cannot be connected to the server, or when the shutdown of the information processing apparatus occurs, there is a fear that synchronization processing cannot be properly performed between the server and the information processing apparatus after the information processing apparatus is connected again to the server. In view of such cases, an arrangement or mechanism is desired which enables proper execution of synchronization processing after the communication with the server is restored.

SUMMARY OF THE INVENTION

The present invention provides an information processing apparatus which, even when a clock time is changed therein during a time period over which communication with a server is disabled, is capable of ensuring temporal matching with the server after the communication is resumed, a method of controlling the information processing apparatus, an information processing system, and a storage medium.

In a first aspect of the invention, there is provided information processing apparatus that communicates with a server, comprising at least one processor and at least one memory coupled to the at least one processor which act as a notification unit configured to notify notification date-and-time information to the server in a case where predetermined processing is performed, a management unit configured to manage a time difference which is a difference between a time defined based on the notification date-and-time information notified by the notification unit and a time indicated by a clock of the information processing apparatus, and a calculation unit configured to calculate an amount of change in the time of the clock in a case where the time of the clock is changed, wherein in the case where the time of the clock is changed, the notification unit calculates a calculation time based on the time difference managed by the management unit and the change amount calculated by the calculation unit and notifies the calculated calculation time as the notification date-and-time information to the server.

In a second aspect of the invention, there is provided an information processing apparatus that communicates with a server, comprising at least one processor and at least one memory coupled to the at least one processor which act as a notification unit configured to notify notification date-and-time information to the server in a case where predetermined processing is performed, and a calculation unit configured to, in a case where a time indicated by a clock of the information processing apparatus is changed, calculate an amount of change in the time of the clock, wherein in the case where the time of the clock is changed, the notification unit notifies the amount of change calculated by the calculation unit to the server, as the notification date-and-time information.

In a third aspect of the invention, there is provided an information processing system including an information processing apparatus, and a server that communicates with the information processing apparatus, wherein the information processing apparatus comprises at least one processor and at least one memory coupled to the at least one processor which act as a notification unit configured to notify notification date-and-time information to the server in a case where predetermined processing is performed, a management unit configured to manage a time difference which is a difference between a time defined based on the notification date-and-time information notified by the notification unit and a time indicated by a clock of the information processing apparatus, and a calculation unit configured to calculate an amount of change in the time of the clock in a case where the time of the clock is changed, wherein in the case where the time of the clock is changed, the notification unit calculates a calculation time based on the time difference managed by the management unit and the change amount calculated by the calculation unit and notifies the calculated calculation time as the notification date-and-time information to the server.

In a fourth aspect of the invention, there is provided an information processing system including an information processing apparatus, and a server that communicates with the information processing apparatus, wherein the information processing apparatus comprises at least one processor and at least one memory coupled to the at least one processor which act as a notification unit configured to notify notification date-and-time information to the server in a case where predetermined processing is performed, and a calculation unit configured to, in a case where a time indicated by a clock of the information processing apparatus is changed, calculate an amount of change in the time of the clock, wherein in the case where the time of the clock is changed, the notification unit notifies the amount of change calculated by the calculation unit to the server, as the notification date-and-time information.

In a fifth aspect of the invention, there is provided a method of controlling an information processing apparatus that communicates with a server, comprising notifying notification date-and-time information to the server in a case where predetermined processing is performed, managing a time difference which is a difference between a time defined based on the notification date-and-time information notified by said notifying and a time indicated by a clock of the information processing apparatus, and calculating an amount of change in the time of the clock in a case where the time of the clock is changed, wherein said notifying includes, in the case where the time of the clock is changed, calculating a calculation time based on the time difference managed by said managing and the amount of change calculated by said calculating, and notifying the calculated calculation time as the notification date-and-time information to the server.

In a sixth aspect of the invention, there is provided a method of controlling an information processing apparatus that communicates with a server, comprising notifying notification date-and-time information to the server in a case where predetermined processing is performed, and calculating, in a case where a time indicated by a clock of the information processing apparatus is changed, an amount of change in the time of the clock, wherein said notifying includes, in the case where the time of the clock is changed, notifying the amount of change calculated by said calculating to the server, as the notification date-and-time information.

In a seventh aspect of the invention, there is provided a non-transitory computer-readable storage medium storing a computer-executable program for executing a method of controlling an information processing apparatus that communicates with a server, wherein the method comprises notifying notification date-and-time information to the server in a case where predetermined processing is performed, managing a time difference which is a difference between a time defined based on the notification date-and-time information notified by said notifying and a time indicated by a clock of the information processing apparatus, and calculating an amount of change in the time of the clock in a case where the time of the clock is changed, wherein said notifying includes, in the case where the time of the clock is changed, calculating a calculation time based on the time difference managed by said managing and the amount of change calculated by said calculating, and notifying the calculated calculation time as the notification date-and-time information to the server.

In an eighth aspect of the invention, there is provided a non-transitory computer-readable storage medium storing a computer-executable program for executing a method of controlling an information processing apparatus that communicates with a server, wherein the method comprises notifying notification date-and-time information to the server in a case where predetermined processing is performed, and calculating, in a case where a time indicated by a clock of the information processing apparatus is changed, an amount of change in the time of the clock, wherein said notifying includes, in the case where the time of the clock is changed, notifying the amount of change calculated by said calculating to the server, as the notification date-and-time information.

According to the invention, even in the case where the time of the clock is changed in the information processing apparatus during a time period over which communication with the server is disabled, it is possible to ensure temporal matching with the server after the communication is resumed.

Further features of the present invention will become apparent from the following description of exemplary embodiments (with reference to the attached drawings).

BRIEF DESCRIPTION OF THE DRAWINGS

FIG. 8 is a diagram of an example of management data containing date-and-time correction values, which is managed by the server.

FIG. 14A is a diagram of an example of address data containing a last data acquisition date and time.

FIG. 14B is a diagram of an example of address data containing another last data acquisition date and time.

FIG. 14C is a diagram of an example of address data containing still another last data acquisition date and time and a data update date and time.

FIG. 16 is a diagram of an example of time clocking information before a change, which is stored in a RAM.

FIG. 17 is a diagram of an example of time clocking information after the change, which is stored in the RAM.

FIG. 18 is a diagram of an example of information on a time change amount.

FIG. 21 is a diagram of an example of information after execution of the update process, which is managed by a data management section.

FIG. 22 is a diagram of an example of information indicative of details of events related to data synchronization processing and a server time and an MFP time at which each event occurs.

FIG. 23 is a diagram of an example of information useful in explaining processing performed by a data synchronization application of the MFP after the communication between the MFP and the server is resumed.

FIG. 24B is a flowchart of a time change amount calculation process.

FIG. 24C is a flowchart of a time changing job transmission process.

FIG. 27 is a diagram of an example of management data containing date-and-time correction values, which is managed by the server.

DESCRIPTION OF THE EMBODIMENTS

The present invention will now be described in detail below with reference to the accompanying drawings showing embodiments thereof.

In a first embodiment, in a case where data synchronization is performed between a server and a plurality of clients, even when data update requests are issued to the server from the respective clients in a random order, the server is enabled to perform data update processing in proper order.

Figure 1:
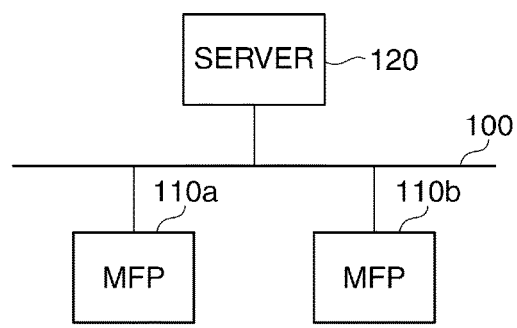
FIG. 1 is a diagram showing the configuration of an information processing system including information processing apparatuses.

FIG. 1 is a diagram showing the configuration of an information processing system including information processing apparatuses according to the first embodiment. In the present embodiment, an information processing apparatus serving as a client is illustrated as an MFP (multifunction printer) 110 (110a or 110b) by way of example. A settings management server apparatus is illustrated as a server 120, by way of example, which is implemented by a personal computer. The number of the MFPs 110 is not particularly limited. Hereafter, when the MFPs 110 are not distinguished from each other, each of the MFPs 110 is simply referred to as the MFP 110. The MFPs 110 are communicably connected to the server 120 via a network 100. Each of the MFPs 110 executes a job for processing predetermined data.

The server 120 manages user operation and execution of processing, such as copying or faxing, of each MFP 110, in association with identification information of the MFP 110, and data associated with date-and-time information. When a change is made to data stored in the MFP 110, which corresponds to the data managed by the server, the MFP 110 transmits contents of the change to the server 120 and requests the same to update the corresponding data. Further, the MFP 110 makes an inquiry of the server 120, periodically or as required, about whether there is an updated data item in the data managed by the server 120, and if there is an updated data item, the MFP 110 acquires the updated data item and stores the same therein.

Address data, such as fax numbers and email address data, in an address book is an example of the data managed by the server 120. When the same address data is used in both the MFP 110a and the MFP 110b, synchronization processing of address data for use in a specific job is performed as follows. Here, the specific job is assumed, for example, to be a fax job for scanning an original and transmitting scanned data to a fax number or an email address of the address data. In a case where it is required to change address data e.g. due to transfer of a worker to a different department or opening a new email address in the MFP 110a, the changed address data is notified to the server 120, and the address data managed by the server 120 is updated. Then, when the MFP 110b makes an inquiry of the server 120 about data update, the server 120 transmits the updated address data as updated data to the MFP 110b. After receiving the updated data, the MFP 110b updates address data therein and stores the updated address data.

Note that although in the present embodiment, the description has been given of a case where the server apparatus is implemented by a personal computer (PC) and each of the clients by a digital MFP, the server apparatus may be a digital MFP, and the clients may be PCs. Further, although address data is taken as an example of data to be synchronized, the data for synchronization may have any form or may be of any type.

Figure 2:
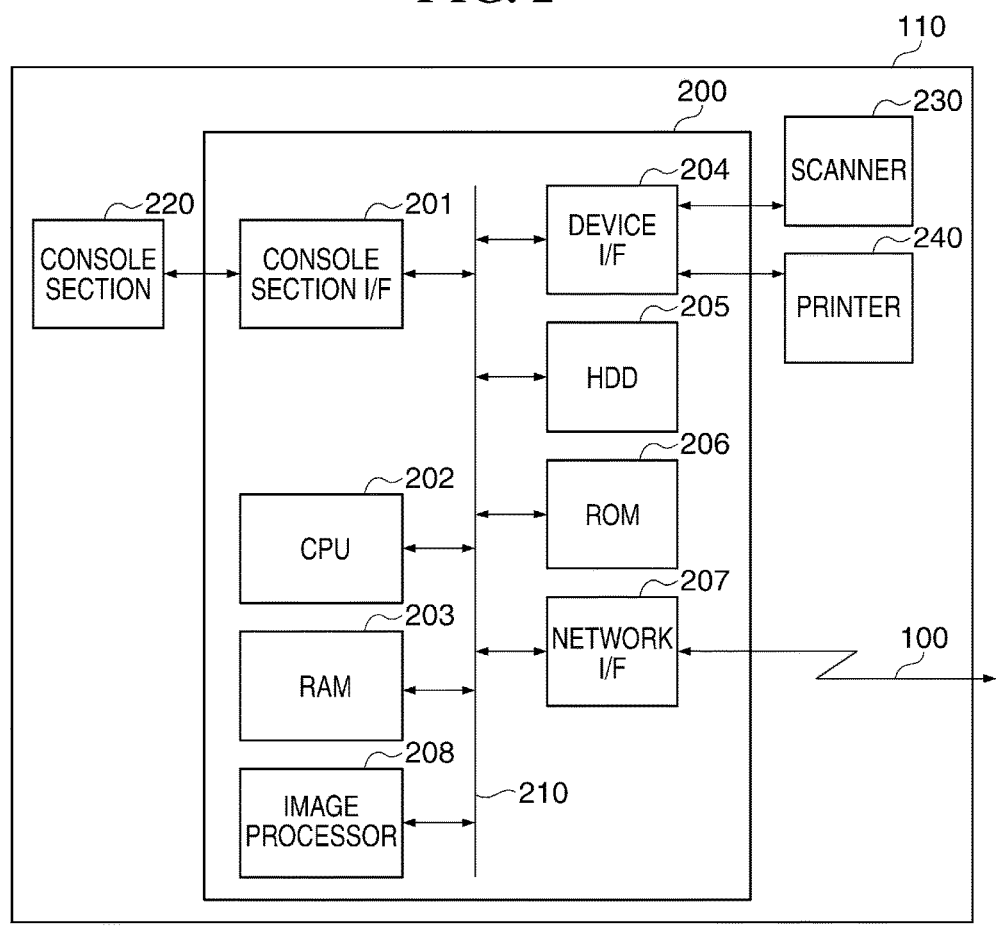
FIG. 2 is a block diagram of an MFP.

FIG. 2 is a block diagram of the MFP 110. The MFP 110 includes a controller unit 200, a console section 220, a scanner 230, and a printer 240. Connected to the controller unit 200 is the console section 220 having a touch panel as well as the scanner 230 as an image input device and the printer 240 as an image output device. The controller unit 200 has a CPU 202. The CPU 202 starts an OS (operation system) by a boot program stored in a ROM 206. The CPU 202 performs various processes by executing application programs stored in an HDD (hard disk drive) 205, on the OS. A RAM 203 is used as a work area for the CPU 202. The HDD 205 stores the above-mentioned application programs and various kinds of data.

Connected to the CPU 202 via a system bus 210 are not only the ROM 206 and the RAM 203 but also an console section interface 201, a device interface 204, a network interface 207, and an image processor 208. The console section interface 201 provides interface with the console section 220. The console section interface 201 sends information, such as various kinds of data to be displayed on the console section 220, to the console section 220, and sends information input by a user to the CPU 202. The device interface 204 is connected to the scanner 230 and the printer 240, for receiving and delivering data and control signals. The network interface 207 is connected to the network 100, for receiving and delivering information from and to each apparatus on the network 100 via the network 100. The image processor 208 performs not only processing on images input from the scanner 230 or images to be output to the printer 240, but also processing, such as image rotation, image compression, resolution conversion, color space conversion, and gradation conversion.

Figure 3:
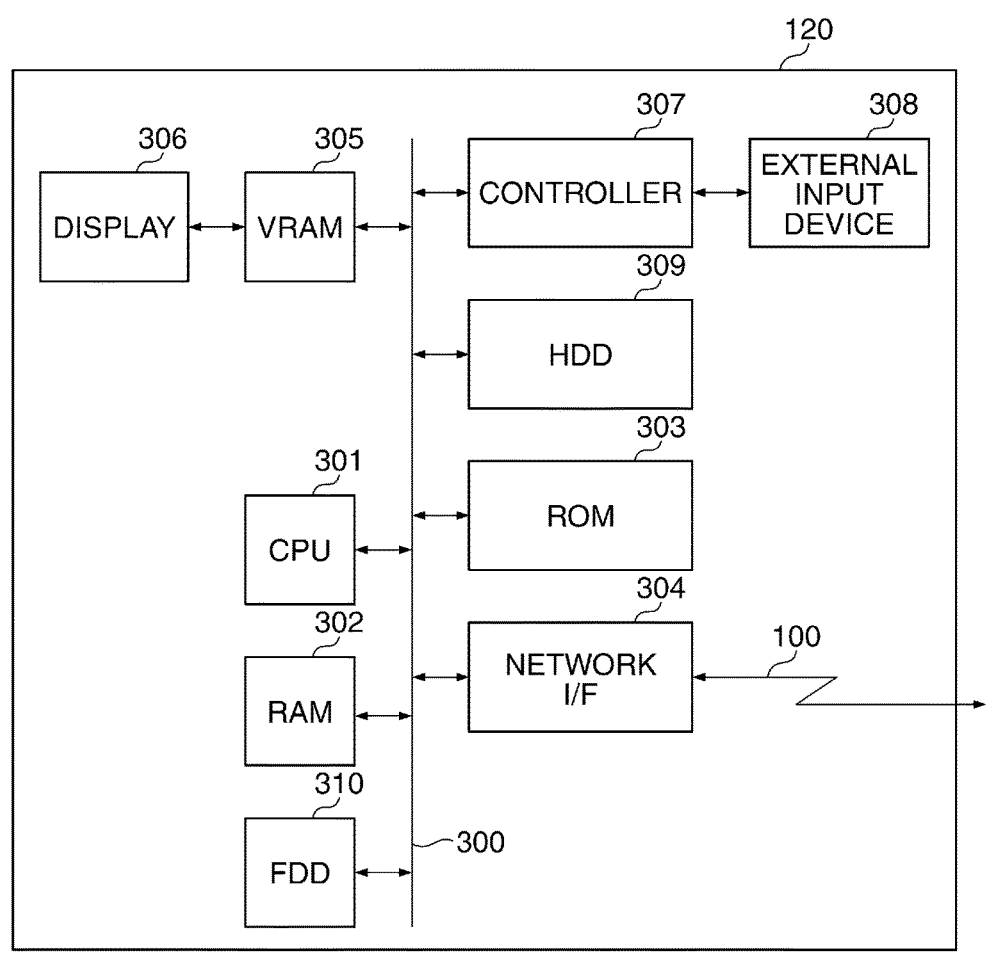
FIG. 3 is a block diagram of a server.

FIG. 3 is a block diagram of the server 120. The server 120 has a transmission bus 300 for connecting between components. The transmission bus 300 serves as an address bus, a data bus, an input/output bus, and a control bus. Connected to a CPU 301 via the transmission bus 300 are a RAM 302, a ROM 303, a network interface 304, a VRAM (video RAM) 305, a controller 307, an HDD 309, and an FDD (flexible disk drive) 310.

The CPU 301 controls the computations and overall operation of the server 120. The RAM 302 serves not only as a main memory for the CPU 301, but also as an area for an execution program and an execution area for the program as well as a data area. The ROM 303 stores operation processing procedures of the CPU 301. The ROM 303 includes a program ROM storing basic software (OS) as a system program for apparatus control and a data ROM storing information and the like required to operate the system. Note that the HDD 309 may be used in place of the ROM 303. The network interface 304 performs communication for data exchange and the like with the MFPs 110 via the network 100. The VRAM 305 has an image rasterized therein for display on a display 306 and controls the display of the image. The controller 307 controls input signals from an external input device 308. The external input device 308 has a pointing device, such as a keyboard or a mouse, and receives user operation. The HDD 309 is used for storing application programs and various kinds of data.

Figure 4:
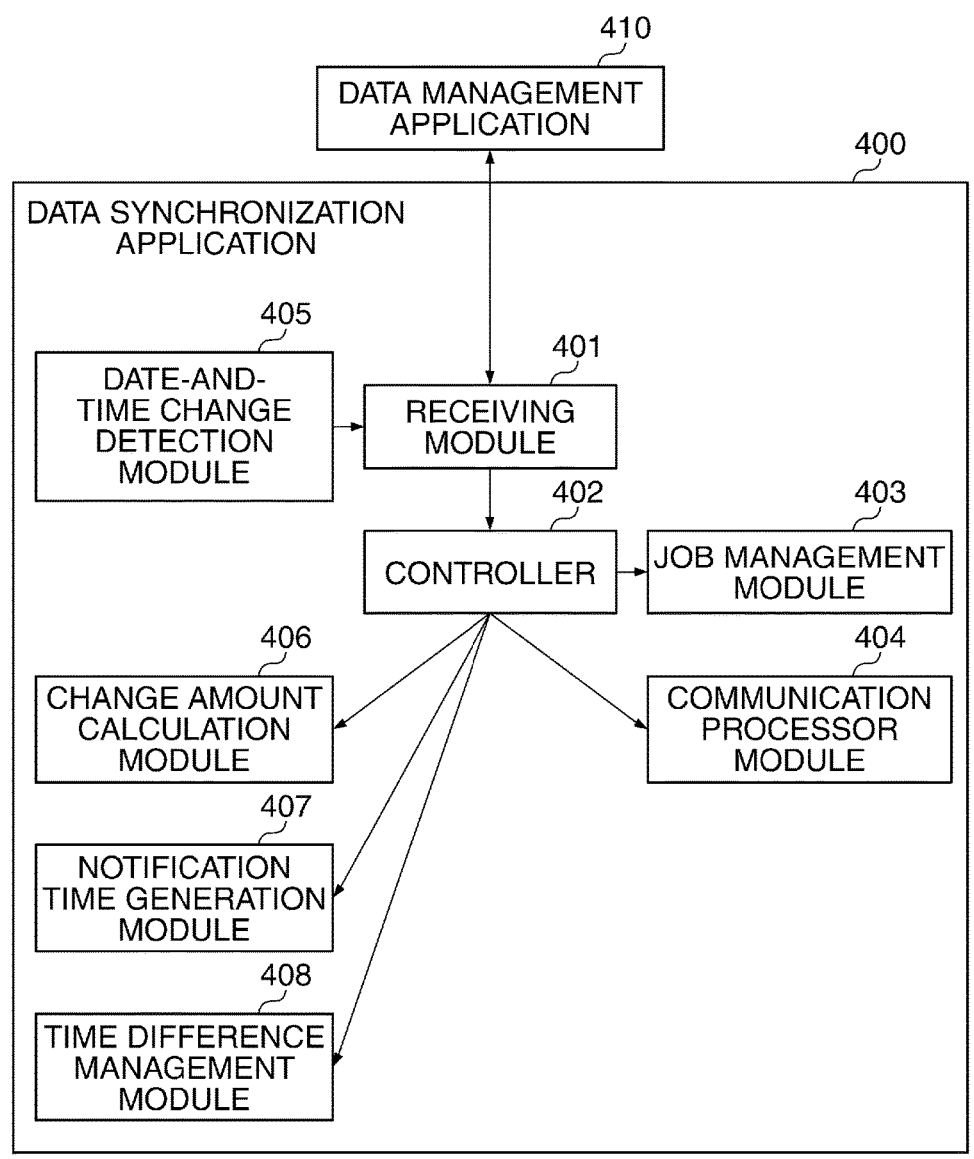
FIG. 4 is a block diagram showing the configuration of a data synchronization application program.

FIG. 4 is a block diagram showing the configuration of a data synchronization application program that operates on the MFP 110. A data synchronization application 400 and a data management application 410 are stored in one of the RAM 203, the HDD 205, and the ROM 206 (see FIG. 2), and are executed by the CPU 202.

The data synchronization application 400 includes a receiving module 401 that receives a processing request from the data management application 410 and the like, and a controller module 402 that controls processing. Further, the data synchronization application 400 includes a job management module 403 that manages the request received by the receiving module 401, as a job. Information on the MFP 110, which is managed as jobs by the job management module 403, is stored in the HDD 205 or the RAM 203. Furthermore, the data synchronization application 400 includes a communication processor module 404 that performs data communication with the server 120 via the network interface 207, and a date-and-time change detection module 405 that detects a change in date-and-time information of the MFP 110. The MFP 110 has a clock, not shown, and a year, a month, a day, and a time indicated by the clock forms the date-and-time information.

When a clock time is changed (corrected) in the MFP 110, a change amount calculation module 406 calculates a difference in clock time before and after the time change as a time change amount ΔT. A notification time generation module 407 generates "notification date-and-time information" as time information to be notified to the server 120. A time difference management module 408 manages "a time difference dT". The time difference dT occurs e.g. when the MFP 110 has its clock time changed during a time period over which communication with the server 120 is disabled, and assuming, for example, that the MFP 110 cannot notify the server 120 of the change of the clock time after occurrence of the clock time change, a state remains in which there is the time difference dT between the MFP 110 and the server.

The time difference dT is the sum total of clock time changes that have occurred in the MFP 110 after the MFP 110 notified a clock time thereof to the server 120 last time. In terms of time passing, the time difference dT is a difference between the current time indicated by the clock of the MFP 110 (hereinafter referred to as the MFP first time T1) and the current time defined based on notified notification data-and-time information notified to the server 120 last time (hereinafter referred to as the MFP second time T2). Here, the MFP second time T2 is the current time calculated based on a time period elapsed after the time indicated by the notification data-and-time information.

The value of the time difference dT is stored in a non-volatile area of the HDD 205 or the like. The data management application 410 not only manages data to be displayed on the console section 220 and stores data input by a user via the console section 220, but also notifies contents of a data update to the receiving module 401.

Figure 5:
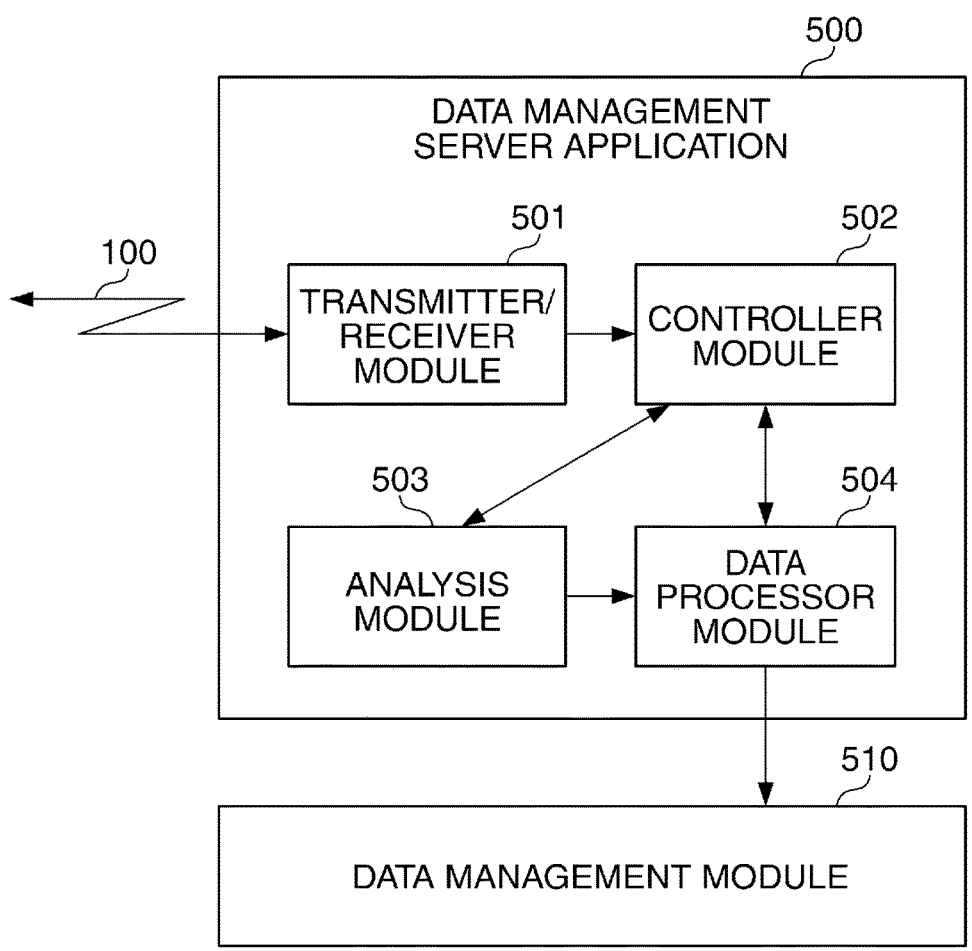
FIG. 5 is a block diagram showing the configuration of a data management server application program.

FIG. 5 is a block diagram showing the configuration of a data management server application program that operates on the server 120. A data management server application 500 (hereinafter simply referred to as the server application 500) and a data management module 510 are stored in one of the RAM 302, the HDD 309, and the ROM 303, and are executed by the CPU 301.

The server application 500 includes a transmitter/receiver module 501 that receives a processing request e.g. from the data synchronization application 400 or transmits a processing result. Further, the server application 500 includes a controller module 502 that controls processing and an analysis module 503 that analyzes a request received by the transmitter/receiver module 501. Furthermore, the server application 500 includes a data processor module 504 that exchanges data with the data management module 510 according to a processing request received by the transmitter/receiver module 501, to thereby create, update, delete, and refer to data. Information under the management of the data management module 510 (i.e. management data) is stored in the HDD 309 or the RAM 302. When participating in the present information processing system, the MFP 110 registers the self apparatus with the server 120. The controller module 402 of the data synchronization application 400 identifies the date-and-time information of the MFP 110 and transmits a registration request via the communication processor module 404 to the server 120, together with the date-and-time information.

Next, descriptions will be given of processing performed when the MFP 110 issue a registration request to the server 120, with reference to FIG. 6, and of processing performed when the server 120 registers the MFP 110 therein, with reference to FIG. 7.

Figure 6:
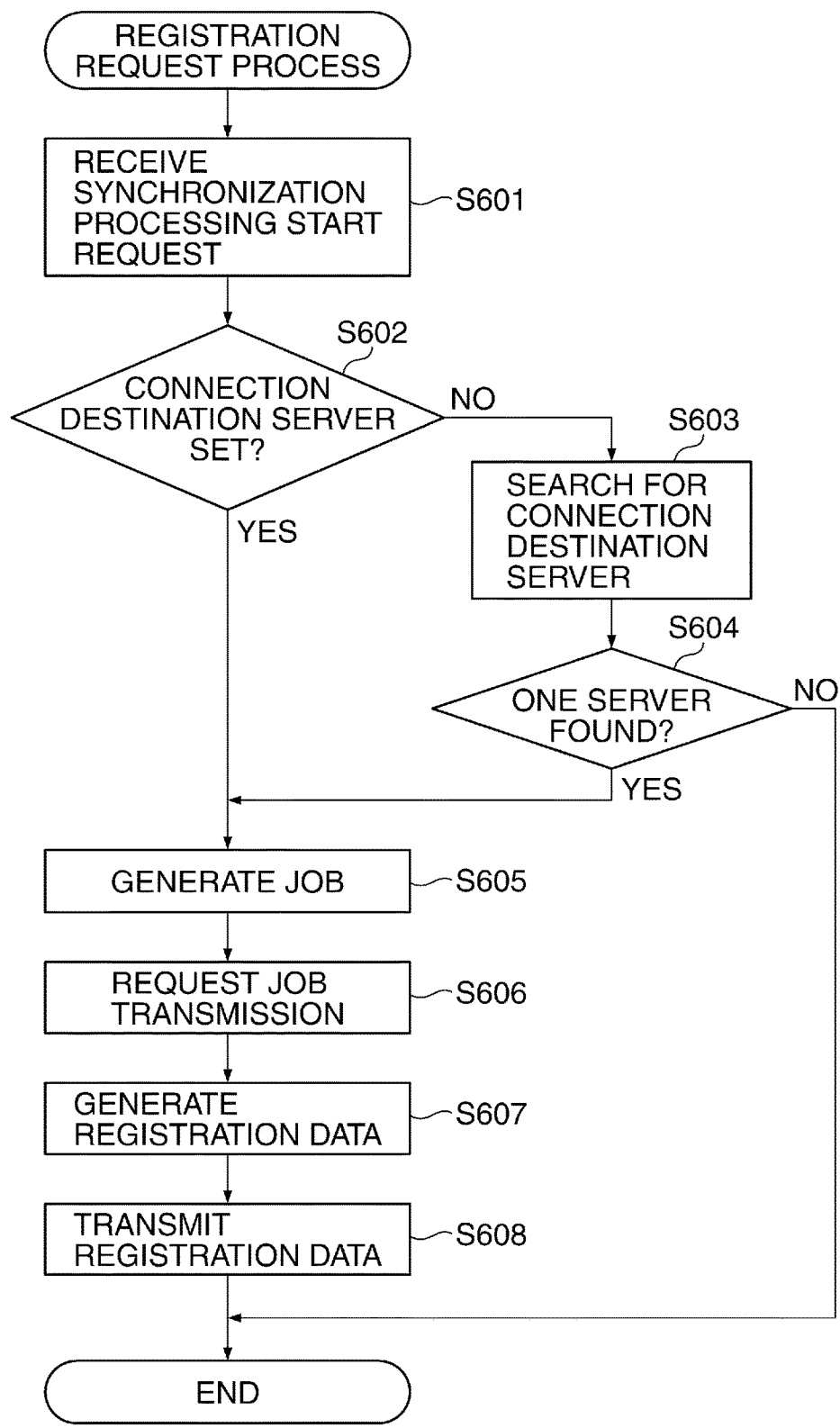
FIG. 6 is a flowchart of a registration requesting process.

FIG. 6 is a flowchart of a registration requesting process performed by the MFP 110 when requesting the server 120 to register the MFP 110. The present process is realized by the CPU 202 executing the data synchronization application 400 and the data management application 410 stored in one of the RAM 203, the HDD 205, and the ROM 206 of the MFP 110. The FIG. 6 process is performed e.g. when a first registration request is issued to the server 120 (i.e. when the MFP 110 is initially connected to the server 120).

First, in a step S601, the receiving module 401 of the data synchronization application 400 receives a synchronization process start request from the console section 220 and notifies the controller module 402 that the synchronization process start request has been received. In a step S602, after receiving the synchronization process start request, the controller module 402 determines whether or not a connection destination server has been registered, i.e. whether or not an IP address or a host name of the server 120 for performing synchronization processing has been registered as a connection destination. If a connection destination server has been registered, the process proceeds to a step S605, whereas if no connection destination server has been registered, the process proceeds to a step S603.

The controller module 402 searches for a connection destination server 120 in the step S603 and determines in a step S604 whether or not a connection destination server 120 has been found by the server search. If it is determined that a plurality of connection destination servers 120 have been found or that no connection destination server 120 has been found, the controller module 402 terminates the FIG. 6 process. On the other hand, if one connection destination server 120 has been found by the server search, the controller module 402 proceeds to the step S605. In the step S605, the controller module 402 generates device information data indicative of information on a device of the MFP 110 and registers the device information data as a job with the job management module 403 (i.e. generates a job). The device information data generated in the step S605 includes information indicative of the current time of the MFP 110 (the MFP first time T1 as notification date-and-time information) and identifier information for identification of a registration requesting apparatus (i.e. for device identification) by the server. The identifier information may be any type of information that enables identification of each client, and hence it may be a serial number assigned on a device-by-device basis, for example.

Then, in a step S606, the controller module 402 reads out the job which was generated and registered with the job management module 403 in the step S605, and requests the communication processor module 404 to perform transmission processing for transmitting the job to the server 120. Then, in a step S607, the controller module 402 generates registration data to be registered with the server 120, based on data existing in the MFP 110. In a step S608, the controller module 402 passes the generated registration data to the communication processor module 404 and causes the communication processor module 404 to transmit the same to the server 120. This causes the synchronization-requesting job to be transmitted to the server 120, whereby the notification date-and-time information is notified to the server 120.

The FIG. 6 process was described as a process that is performed when performing predetermined processing or specifically when the first registration request is issued to the server 120, so as to achieve time correction required for matching between the clock time of the server 120 and that of the MFP 110. However, timing for the time correction is not limited to the time when the first registration request is issued. The time of a clock provided in a general computer deviates from proper time by 15 to 20 seconds per month. If the time is not changed even once after execution of the initial registration request, the respective times of the MFP 110*a* and the MFP 110*b* deviate from the time of the server 120, which can cause a synchronization problem. To avoid this, time correction may be performed with desired timing, e.g. when the MFP 110 is started or recovers from sleep or when synchronization processing performed between the server 120 and the MFP 110 is resumed after suspension. By performing any of these, it is possible to correct deviation of the time of the clock with the lapse of time, on an as needed basis.

Figure 7:
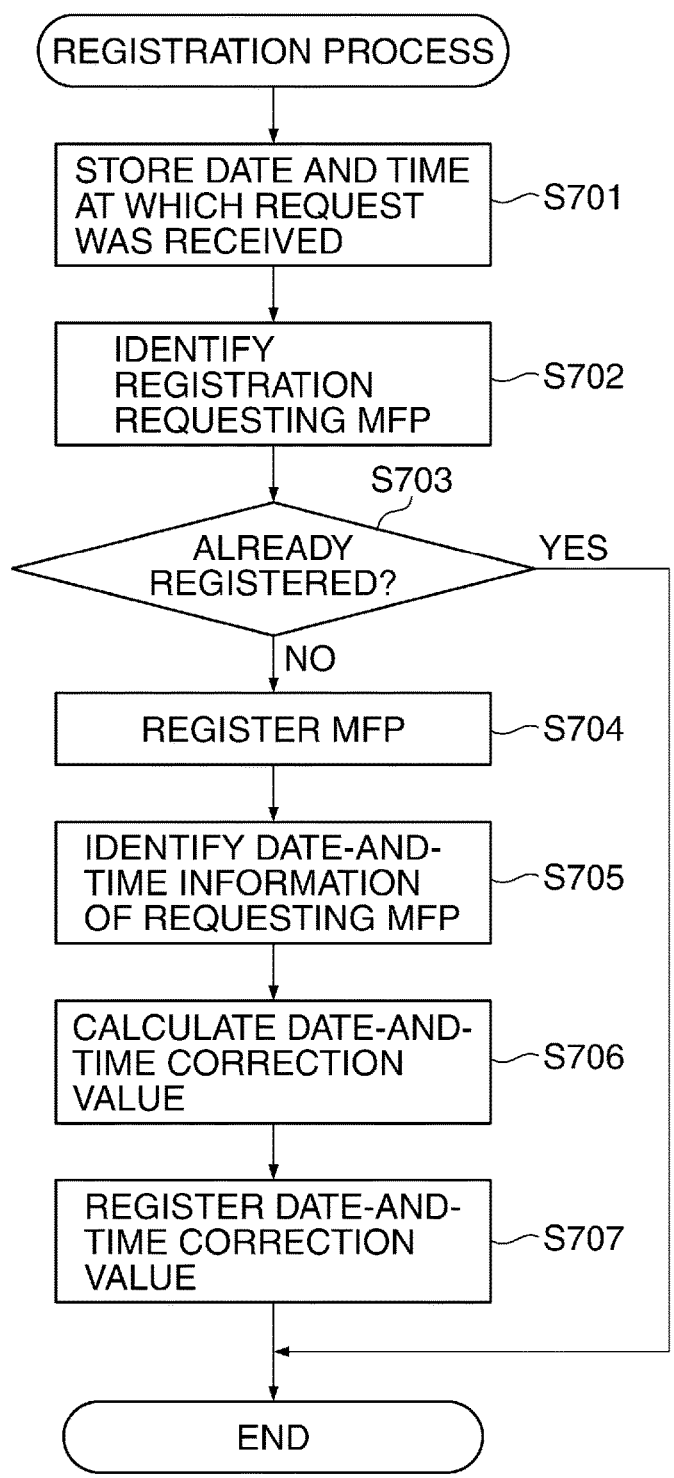
FIG. 7 is a flowchart of a registration process.

FIG. 7 is a flowchart of a registration process performed by the server 120. The present process corresponds to processing performed by the server application 500 operating on the server 120 when a registration request is received from the MFP 110. Note that steps appearing in FIG. 7 are realized by execution of the server application 500 by the CPU 301 of the server 120. In the following description, each module of the server application 500 executed by the CPU 301 will be described as a processing entity.

In the FIG. 7 process, the server 120 stores "a date-and-time correction value" for each associated one of the MFPs 110, based on the notification date-and-time information (the MFP first time T1 in the present example) contained in the synchronization-requesting job at the time of requesting registration. The server 120 corrects the notification date-and-time information contained in each of the following synchronization requests to a clock time in the server 120 to thereby ensure the matching of the order of the synchronization requests from the MFPs 110.

First, in a step S701, when the transmitter/receiver module 501 receives a registration request, the controller module 502 stores in the RAM 302 a date and time of the clock of the server 120 at the time of receiving the registration request. In a step S702, the analysis module 503 identifies identifier information by analyzing the received registration request, and the controller module 502 identifies the MFP 110 as a registration requesting source based on the identified identifier information. Then, the controller module 502 requests the data processor module 504 to execute registration processing. Here, the identifier information is e.g. a serial number assigned to the MFP 110, as mentioned hereinbefore.

In a step S703, the data processor module 504 determines whether or not the MFP 110 as a registration requesting source has been registered with the data management module 510, i.e. whether or not information under the management of the data management module 510 contains the identifier information of the MFP 110 as a registration requesting source. If the MFP 110 as a registration requesting source has already been registered, it is determined that the present registration request is an error, and the FIG. 7 process is terminated. On the other hand, if the MFP 110 as a registration requesting source has not been registered, the process proceeds to a step S704, wherein the data processor module 504 notifies the data management module 510 of the identifier information of the MFP 110 as a registration requesting source and causes the data management module 510 to register the same. Note that the information under the management of the data management module 510 (i.e. management data) is stored in the HDD 309, as described hereinbefore, and the identifier information of the MFP 110 as a registration requesting source is added to the management data.

In a step S705, the data processor module 504 identifies the notification date-and-time information (MFP first time T1) contained in the registration request from the MFP 110. In a step S706, "a date-and-time correction value" is calculated based on the date and time of reception of the request by the server 120, which was stored in the step S701, and the MFP first time T1 identified in the step S705. The time indicated by the clock of the server 120 will be referred to as "the server time". As "the server time", there is used a time with reference to which the data management server application 500 operates on the server 120. The date-and-time correction value is calculated by subtracting "the server time" from "the notification date-and-time information" ("date-and-time correction value"="notification date-and-time information"−"server time"). Here, the notification date-and-time information at the time of reception of a registration request is the MFP first time T1, and hence the date-and-time correction value is calculated as "date-and-time correction value"="MFP first time T1"−"server time". Accordingly, when the clock of the MFP 110 is ahead of that of the server 120, the date-and-time correction value assumes a positive value. In a step S707, the data processor module 504 requests the data management module 510 to store the date-and-time correction value (assumed to be "00:10" in the illustrated example) calculated in the step S706 as management data in association with the identifier information of the MFP 110 registered in the step S704. The data management module 510 registers the date-and-time correction value in the management data, followed by the terminating the FIG. 7 process.

FIG. 8 shows management data containing date-and-time correction values, which is managed by the server 120. This is an example of management data under the management of the data management module 510 after completion of registration of the MFPs 110*a* and 110*b*. As for the MFP 110*a*, the date-and-time correction value is stored as "00:10", which indicates that the clock of the MFP 110*a* is ten minutes ahead of that of the server 120. As for the MFP 110*b*, the date-and-time correction value is stored as "−00: 10", which indicates that the clock of the MFP 110*b* is ten minutes behind that of the server 120.

Next, a description will be given, with reference to FIGS. 9 and 10, of how the MFP 110 and the server 120 operate when a setting is changed in the MFP 110 after execution of the registration process.

Figure 9:
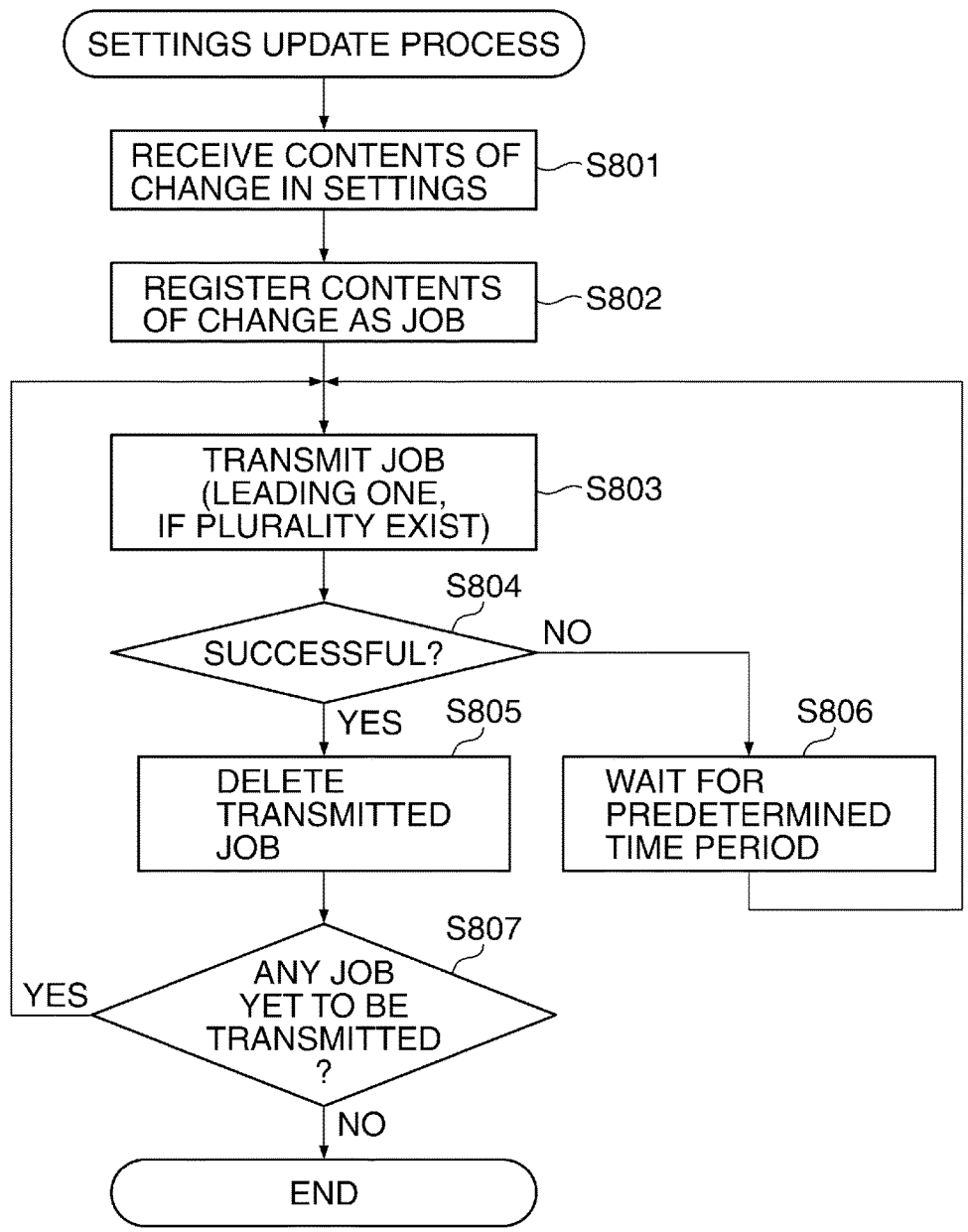
FIG. 9 is a flowchart of a settings update process.

FIG. 9 is a flowchart of a settings update process performed by the MFP 110. Steps appearing in FIG. 9 are realized by the CPU 202 of the MFP 110 executing the data synchronization application 400 stored in the ROM 206 or the HDD 205.

First, in a step S801, the receiving module 401 receives contents of a change in settings made using the console section 220 or the like, and the date and time of the change made to data, from the data management application 410, and notifies these to the controller module 402. In a step S802, the controller module 402 registers the notified contents as a job with the job management module 403. Then, in a step S803, the controller module 402 reads the job registered with the job management module 403 and requests the communication processor module 404 to transmit the read job to the server 120. Thus, the job is transmitted to the server 120. At this time, when there are a plurality of registered jobs, the controller module 402 makes a transmission request to the communication processor module 404, starting with a leading job (with an oldest generation time). Note that in each transmitted job, there are described a job generation time and a job transmission time. The order of transmission is determined based on the job generation time.

In a step S804, the controller module 402 determines whether or not the job transmission is successful. If the job transmission is not successful, the controller module 402 waits for a time period corresponding to a predetermined retry interval (predetermined time period) (step S806), and then returns to the step S803, wherein job transmission processing is executed again. On the other hand, if the job transmission is successful, the process proceeds to a step S805, wherein the controller module 402 requests the job management module 403 to delete the transmitted job. This causes the transmitted job to be deleted from the HDD 205 or RAM 203 where it was stored. Then, it is determined in a step S807 whether there remains a job yet to be transmitted. If there remains a job yet to be transmitted, the process returns to the step S803, whereas there remains no job yet to be transmitted, the FIG. 9 process is terminated.

Figure 10:
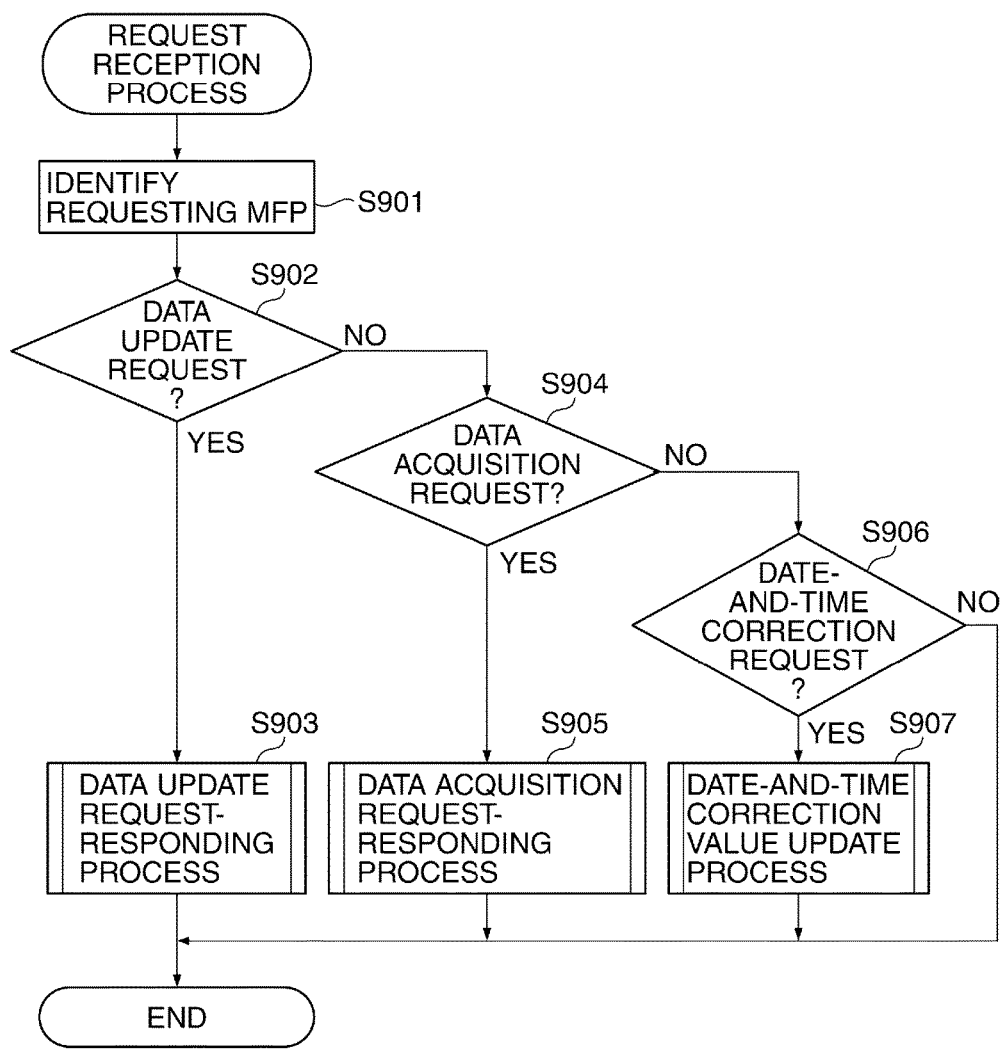
FIG. 10 is a flowchart of a request reception process.

FIG. 10 is a flowchart of a request reception process performed by the server 120. The present process is started when the server 120 receives a data update request, a data acquisition request, or a date-and-time correction request, as a synchronization job, from the MFP 110. This process is realized by the CPU 301 executing the server application 500. In the following description, each module of the server application 500 executed by the CPU 301 will be described as a processing entity.

First, in a step S901, upon receipt of a job from the MFP 110, the transmitter/receiver module 501 notifies the controller module 502 of the job, and the controller module 502 passes the received job to the analysis module 503 for analysis of the same, and identifies the MFP 110 as a registration requesting source based on identifier information identified through the analysis. Note that when the MFP 110 as a registration requesting source cannot be identified in the step S901, the FIG. 9 process is terminated as an error, although not shown in FIG. 10.

In a step S902, the controller module 502 acquires contents of the request from the analysis module 503 and determines whether or not the request by the job is a data update request. If the request is a data update request, the controller module 502 performs a data update request-responding process (described hereinafter with reference to FIG. 11) in a step S903, followed by terminating the FIG. 9 process. On the other hand, if the request is not a data update request, the controller module 502 determines in a step S904 whether or not the request by the job is a data acquisition request. If the request is a data acquisition request, the controller module 502 performs a data acquisition request-responding process (described hereinafter with reference to FIG. 13) in a step S905, followed by terminating the FIG. 9 process. On the other hand, if the request is not a data acquisition request, the controller module 502 determines in a step S906 whether or not the request by the job is a data-and-time correction request. If the request is a data-and-time correction request, the controller module 502 performs a date-and-time correction value update process (described hereinafter with reference to FIG. 20) in a step S907, followed by terminating the FIG. 9 process. On the other hand, if the request is not a data-and-time correction request, the controller module 502 terminates the FIG. 9 process.

Figure 11:
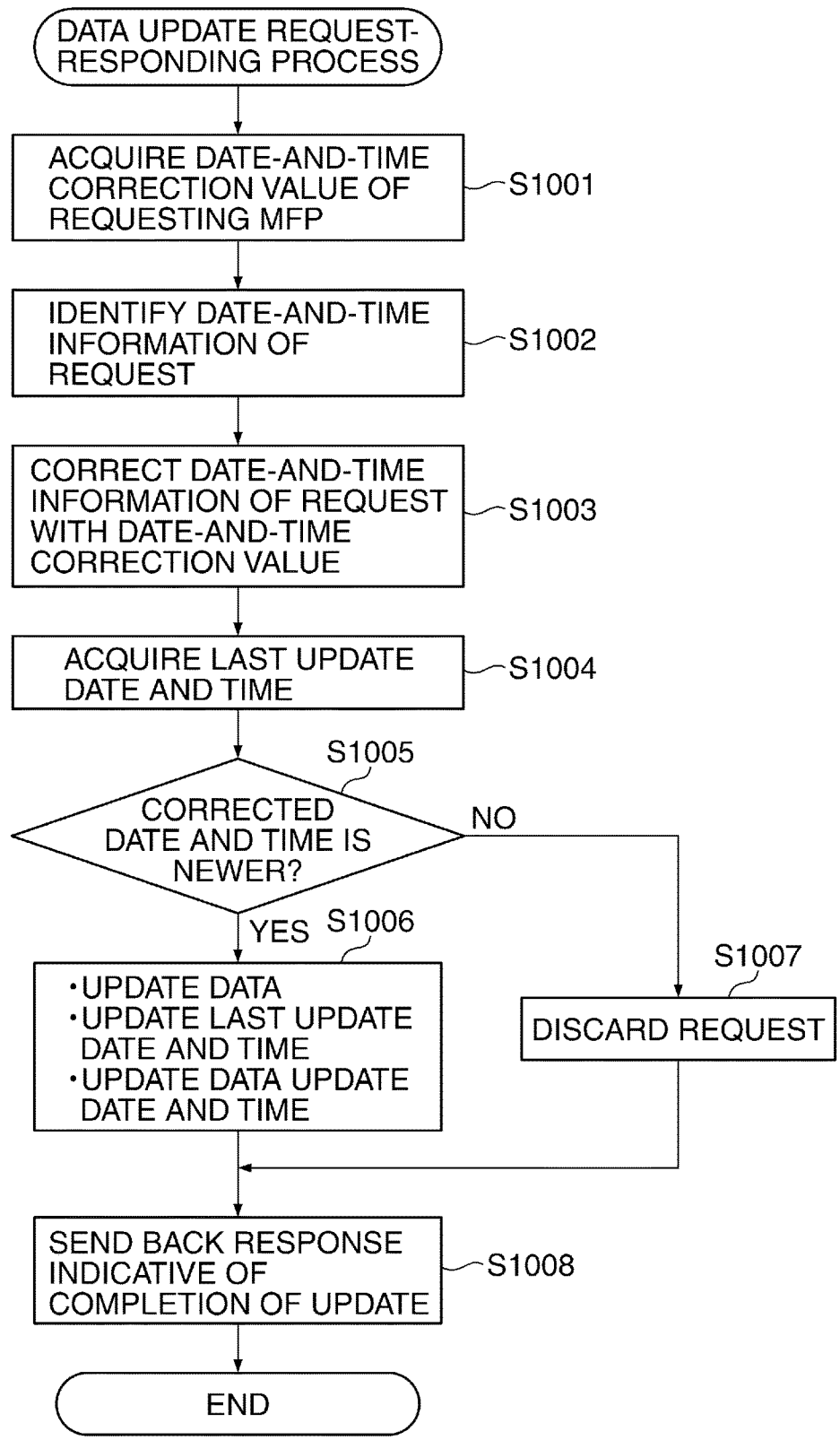
FIG. 11 is a flowchart of a data update request-responding process.

FIG. 11 is a flowchart of the data update request-responding process performed in the step S903 in FIG. 10. In FIG. 11, a process performed by the server application 500 when the server 120 receives an address data update-requesting job as a data update request from the MFP 110 is shown by way of example. The description will be given based on examples of date and time.

First, in a step S1001, the controller module 502 acquires a date-and-time correction value associated with the MFP 110 as an update requesting source ("00:10" for the MFP 110*a*; see FIG. 8) from the management data stored in the data management module 510. In a step S1002, the controller module 502 acquires e.g. "2015/01/01 11:10" as date-and-time information (notification date-and-time information) of the received request contents from the analysis module 503. In a step S1003, the controller module 502 corrects the notification date-and-time information acquired in the step S1002 with the date-and-time correction value acquired in the step S1001, to thereby obtain a corrected time "2015/01/01 11:00" as date-and-time information of the updated data. This enables the server 120 to recognize (identify) a clock time, when the data update request was issued, of the MFP 110.

In a step S1004, the controller module 502 acquires contents of data for update from the analysis module 503 and passes the contents of data for update and the corrected time information obtained in the step S1003 to the data processor module 504. The data processor module 504 acquires a last update date and time of the data for update from the data management module 510. The last update date and time is time information obtained by correcting a time at which data was updated in each MFP 110 with a clock time of the server 120, and is used to determine a time order relationship between update requests from the respective MFPs 110. In a step S1005, the data processor module 504 compares between the last update date and time of the address data for update, which was acquired in the step S1004, and the corrected date and time obtained in the step S1003, and determines whether or not the corrected date and time is newer than the last update date and time. If the corrected date and time is newer than the last update date and time, the process proceeds to a step S1006.

In the step S1006, the data processor module 504 requests the data management module 510 to update the address data for update with a requested value. In response to this request, the data management module 510 updates the address data contained in the management data under management thereof. Further, the data processor module 504 updates the last update date and time of the updated address data to the corrected date and time, and updates a data update date and time to a server time (e.g. "2015/01/01 11:01") at which the processing was executed. The data update date and time is a time at which a data change was reflected on the data under the management of the data management module 510 of the server 120, and is used as time information when each MFP 110 acquires contents of an update from the server 120.

On the other hand, if it is determined in the step S1005 that the corrected date and time is not newer than the last update date and time, the data processor module 504 discards the contents of the request corresponding to the received job in a step S1007, and proceeds to a step S1008. In the step S1008, the transmitter/receiver module 501 sends back a response indicative of completion of the update to the MFP 110 as the registration requesting source, followed by terminating the FIG. 11 process. Note that if it is determined that the MFP 110 has not received the response indicative of completion of the update even after the lapse of a predetermined time period, the server 120 can determine that the MFP 110 is not connected to the network 100.

Next, a description will be given, with reference to FIGS. 12 and 13, of how the data synchronization application 400 in the MFP 110 and the server application 500 in the server 120 operate when the MFP 110 requests the server 120 to acquire updated data.

Figure 12:
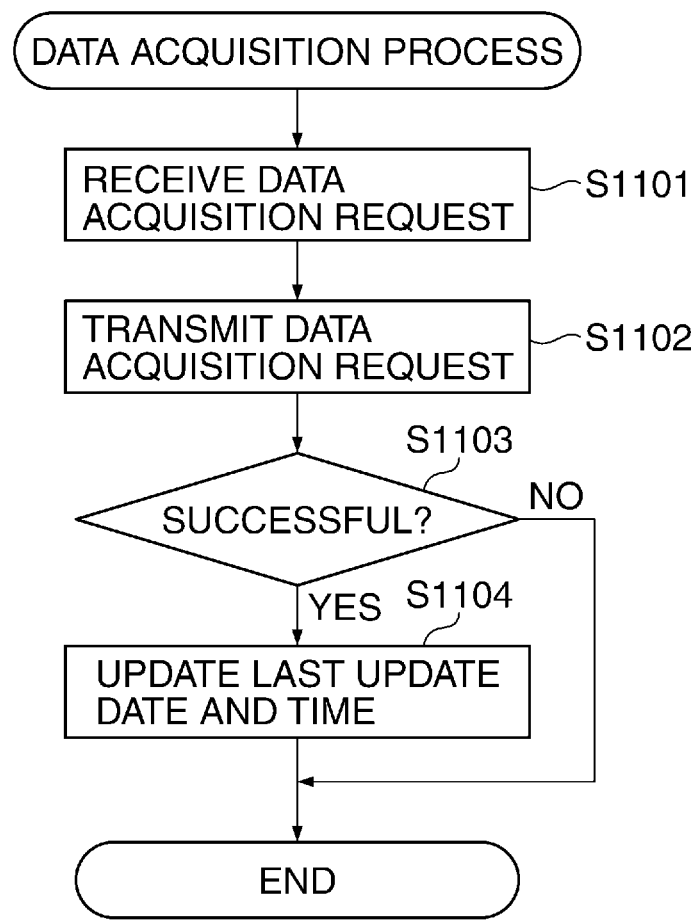
FIG. 12 is a flowchart of a data acquisition process.

FIG. 12 is a flowchart of a data acquisition process performed by the MFP 110. Steps appearing in FIG. 12 are realized by the CPU 202 of the MFP 110 executing the data synchronization application 400. The FIG. 12 process is a process in which one MFP 110 (e.g. MFP 110a) makes a request for acquiring settings changed in another MFP 110 (e.g. the MFP 110b) e.g. after execution of the registration request process in FIG. 6. Processing for causing changes in settings, which have been reflected on the server 120, to be reflected on the MFP 110 is realized by a request for acquiring contents of the changes from the MFP 110. This request for acquiring the contents of the changes is issued at fixed intervals or in conjunction with a user login process using user login as a trigger.

First, in a step S1101, the receiving module 401 receives a data acquisition request generated based on a fact that a user has logged in the MFP 110 via the console section 220 or that a predetermined time period has elapsed after receipt of the last request for acquiring contents of changes. This data acquisition request contains information indicative of data to be acquired and information indicative of the last update date and time at which corresponding data was acquired for update from the server 120 last time, and is notified to the controller module 402. In a step S1102, the controller module 402 notifies the data acquisition request to the communication processor module 404, and the communication processor module 404 transmits the data acquisition request to the server 120. The controller module 402 determines in a step S1103 whether or not the transmission of the data acquisition request is successful. If the transmission of the data acquisition request is successful, the controller module 402 acquires the last update date and time contained in a response sent back from the server 120 and updates the same (step S1104). On the other hand, if the transmission of the data acquisition request is not successful, the controller module 402 terminates the FIG. 12 process.

Figure 13:
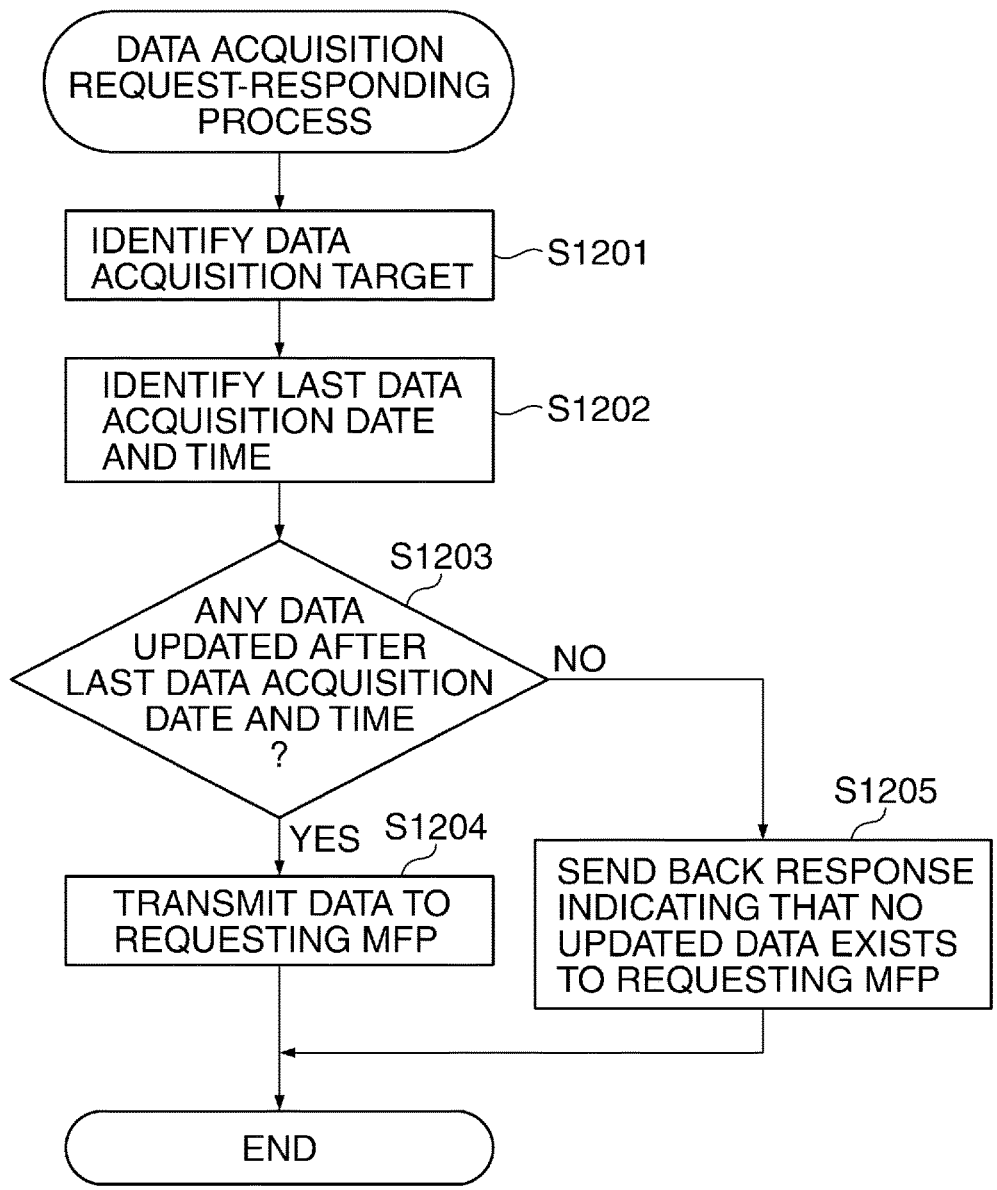
FIG. 13 is a flowchart of a data acquisition request-responding process.

FIG. 13 is a flowchart of the data acquisition request-responding process performed in the step S905 in FIG. 9. In a step S1201, the controller module 502 passes the received request contents to the analysis module 503 to thereby identify a target of data acquisition. In a step S1202, the controller module 502 identifies the last data acquisition date and time contained in the acquisition request, which is acquired from the analysis module 503, and passes information indicating that the data is e.g. address data and information indicative of the last data acquisition date and time, to the data processor module 504. In a step S1203, the data processor module 504 determines whether or not the address data under the management of the data management module 510 contains address data item updated after the last data acquisition date and time. In doing this, the data management module 510 determines an address data item under the management of which the data update date and time is newer than the last data acquisition date and time, and notifies the address data item to the data processor module 504 by returning the same, and the data processor module 504 determines, based on the notification, that the address data under the management of the data management module 510 contains address data item updated after the last data acquisition date and time.

If it is determined in the step S1203 that the address data under the management of the data management module 510 contains the address data item updated after the last data acquisition date and time, the data processor module 504 sends back the address data item returned from the data management module 510 and date-and-time information indicative of a date and time at which processing in the step S1203 was executed to the MFP 110 as the registration requesting source, in a step S1204. On the other hand, if the address data under the management of the data management module 510 contains no address data item updated after the last data acquisition date and time, the data processor module 504 sends back only the date-and-time information indicative of the date and time at which the processing in the step S1203 was executed to the MFP 110 as the registration requesting source in a step S1205. After execution of the step S1204 or S1205, the FIG. 13 process is terminated.

Now, a description will be given, with reference to FIGS. 14A to 14C, of the FIG. 13 process based on examples.

Let it be assumed that a data acquisition request is issued from the MFP 110a and the data acquisition request contains "2015/01/01 11:00" as the last data acquisition date and time. The data management module 510 searches for an information item containing a data update date and time newer than the last data acquisition date and time "2015/01/01 11:00". As is apparent from FIG. 14C, a data update date and time of email address data associated with AddressA is "2015/01/01 11:01", and hence this email address data is sent back in response to the data acquisition request.

Further, in a case where a date and time at which the processing in the step S1203 was executed is "2015/01/01 12:10", email address data under the management of the data management application 410 of the MFP 110a after completion of the processing is as shown in FIG. 14A. Further, in a case where the MFP 110b also executes the same data acquisition process and a date and time at which the processing in the step S1203 was executed is "2015/01/01 12:11", email address data under the management of the data management application 410 of the MFP 110b after completion of the processing is updated is as shown in FIG. 14B.

Figure 15A:
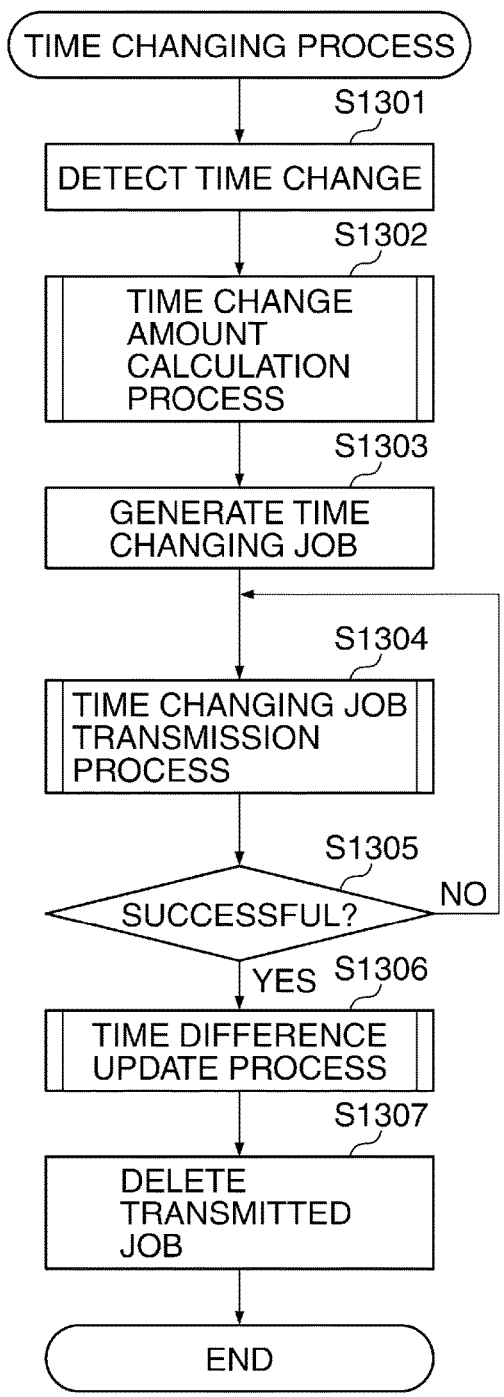
FIG. 15A is a flowchart of a time changing process.

FIG. 15A is a flowchart of a time changing process performed by the MFP 110. This process is performed in a case where the time of the clock of the MFP 110 is changed (corrected). Steps appearing in FIG. 15A are realized by the CPU 202 executing the data synchronization application 400 and the data management application 410 stored in one of the RAM 203, the HDD 205, and the ROM 206 of the MFP 110.

First, in a step S1301, the date-and-time change detection module 405 detects that the clock time of the MFP 110 has been changed, and notifies the controller module 402 of the fact. In a step S1302, the controller module 402 performs a time change amount calculation process (described hereinafter with reference to FIG. 15B) and causes the change amount calculation module 406 to calculate the amount of change in clock time (hereinafter referred to as the time change amount $\Delta T$). Then, in a step S1303, the controller module 402 generates a time changing job based on the time change amount $\Delta T$ calculated in the step S1302 and registers this job with the job management module 403. The time change amount $\Delta T$ is held as job information in the job. In a step S1304, the controller module 402 performs a time changing job transmission process (described hereinafter with reference to FIG. 19A). In this process, which will be described in detail hereinafter, the controller module 402 acquires the job from the job management module 403, causes the notification time generation module 407 to generate notification date-and-time information to be notified to the server 120, and requests the communication processor module 404 to transmit the job.

In a step S1305, the controller module 402 determines whether or not the job transmission is successful. If the job transmission is not successful, the controller module 402 returns to the step S1304. On the other hand, if the job transmission is successful, the controller module 402 performs a time difference update process (described hereinafter with reference to FIG. 19B) in a step S1306. Then, in a step S1307, the controller module 402 requests the job management module 403 to delete the transmitted job. This causes the transmitted job to be deleted from the HDD 205 or RAM 203 where it was stored.

Figure 15B:
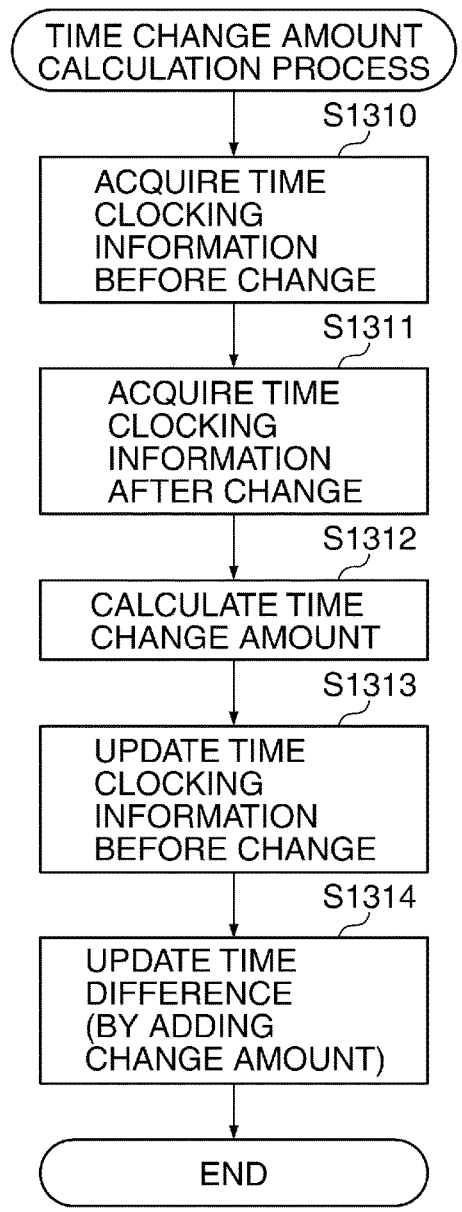
FIG. 15B is a flowchart of a time change amount calculation process.

FIG. 15B is a flowchart of the time change amount calculation process performed in the step S1302 in FIG. 15A. First, in a step S1310, the controller module 402 acquires time clocking information before the change, which is stored in the RAM 203. FIG. 16 shows an example of the time clocking information before the change.

The RAM 203 stores a count value of a time counter and a snapshot value of time information, which were obtained at a certain time point, as the time clocking information before the change. The time counter is initialized to 0 at the startup of the MFP 110 and is counted up until the shutdown of the same. The time counter is only required to have a time counting function, and may be a time clocking device independent of the clock provided in the MFP 110. The time information is a clock time indicated by the clock of a device of the MFP 110. The values of the time clocking information before the change appearing in FIG. 16 are values obtained at the startup of the device or values updated in a step S1313, described hereinafter. In a step S1311, the controller module 402 acquires time clocking information after the change and temporarily stores the same in the RAM 203. The time clocking information after the change is formed by the current value of the time counter and the current time indicated by the clock of the device. FIG. 17 shows an example of the time clocking information after the change which are a count value of the time counter and a snapshot value of the time information, which are obtained after the time is changed.

In a step S1312, the controller module 402 causes the change amount calculation module 406 to calculate the time change amount $\Delta T$ based on the time clocking information before the change acquired in the step S1310 and the time clocking information after the change acquired in the step S1311. The time change amount $\Delta T$ at this time is calculated as "difference between the respective snapshot values of the time information obtained after and before the time change"–"difference between the respective count values of the time counter obtained after and before the time change". Taking FIGS. 16 and 17 as an example, the time change amount $\Delta T$ is calculated as follow:

The difference between the values of the time counter is calculated as 4600-1000=3600 (seconds). This indicates that the time counter has counted the elapsed time of one hour. On the other hand, the difference between the snapshot values of the time information is calculated as 9:30-8:00=1:30, which indicates that the clock time has advanced by one hour and a half. Consequently, the time change amount $\Delta T$ is calculated as 1 hour 30 minutes−1 hour=30 minutes, and 30 minutes is obtained as the time change amount $\Delta T$ as shown in FIG. 18. In short, it is known that the clock time has been corrected by 30 minutes in an advancing direction.

In the step S1313, the controller module 402 updates the time clocking information before the change (see FIG. 16) to the time clocking information after the change (see FIG. 17) acquired in the step S1311. This processing is performed so as to use the time clocking information after the change acquired in the step S1311, as time clocking information before the change when the time changing process is performed next time. In a step S1314, the controller module 402 requests the time difference management module 408 to update the time difference dT. In response to this request, the time difference management module 408 adds the time change amount $\Delta T$ calculated in the step S1312 to the currently managed time difference dT to thereby update the time difference dT.

The notification date-and-time information is notified to the server 120 through processing in the step S606 or in a step S1324, described hereinafter. The time difference dT, which is a value determined based on the notification date-and-time information, as described hereinbefore, has its initial value set to 0, and is stored in a nonvolatile area, such as the HDD 205. The time difference dT is calculated again and updated in the step S1314, described hereinbefore, and in a step S1331, described hereinafter. In other words, when synchronization is properly maintained between the MFP 110 and the server 120, the time difference dT assumes a value of 0. However, when there is a problem with the network 100 or when the clock time of the MFP 110 is changed during the shutdown of the server 120 e.g. by maintenance, the time change amount $\Delta T$ calculated in the step S1312 is added to the time difference dT whenever time change occurs.

Note that although in the FIG. 15B process, the time change amount $\Delta T$ is calculated using the counter values of the time counter and the snapshot values of the time information, the calculation method is not limited to this. For example, a method may be employed in which when a user changes the clock time via the console section 220, a difference value between the device clock time and a user input time is calculated and stored in the RAM 203 or the HDD 205, and is read in as the time change amount $\Delta T$.

Figure 19A:
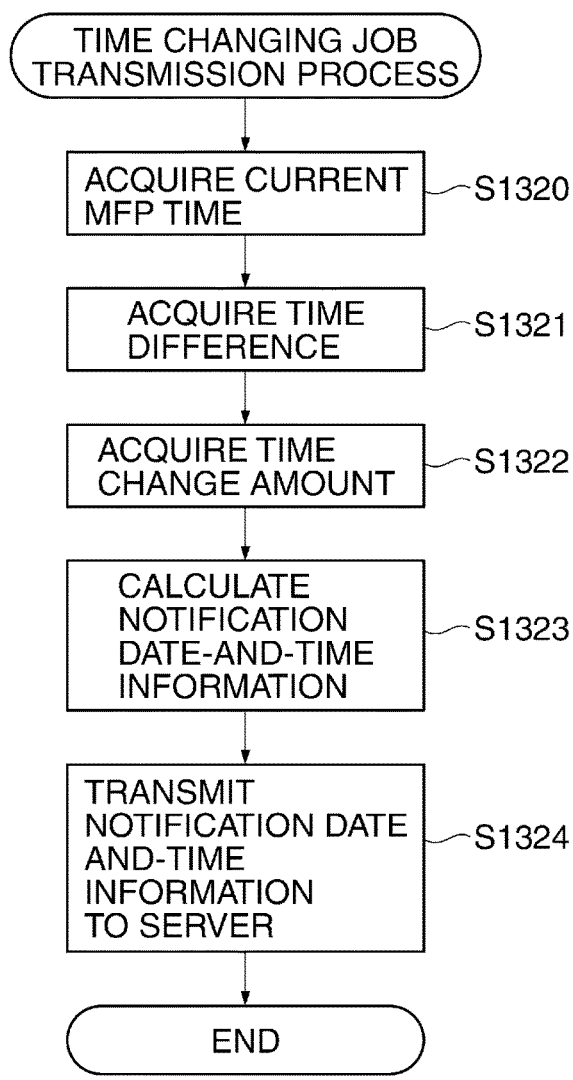
FIG. 19A is a flowchart of a time changing job transmission process.

FIG. 19A is a flowchart of the time changing job transmission process performed in the step S1304 in FIG. 15A. First, in a step S1320, the controller module 402 acquires the MFP first time T1 indicated by the current clock time of the MFP 110. In a step S1321, the controller module 402 acquires the time difference dT calculated in the step S1314, from the time difference management module 408. In a step S1322, the controller module 402 acquires the time change amount ΔT calculated in the step S1302. In a step S1323, the controller module 402 calculates a calculation time cT based on the time difference dT and the time change amount ΔT, using the following equation (1):

$$\text{calculation time } cT = MFP \text{ first time } T1 - \text{time difference } dT + \text{time change amount } \Delta T \quad (1)$$

wherein the MFP first time T1 in the equation (1) is the value acquired in the step S1320. This calculation time cT is used as notification date-and-time information to be notified next.

Next, in a step S1324, the controller module 402 adds the calculation time cT as notification date-and-time information to the time changing job, and requests the communication processor module 404 to transmit the job. The transmission of the time changing job by the communication processor module 404 notifies the notification date-and-time information to the server 120, followed by terminating the present process. Note that in a case where the job cannot be transmitted in the step S1324, i.e. in a case where notification of the completion of processing of the job is not received from the server 120, the job is stored as unprocessed job in a queue managed by the job management module 403, and the processing for transmission thereof is performed again after the lapse of a predetermined time period. The order of transmission corresponds to the order of job generation.

Figure 19B:
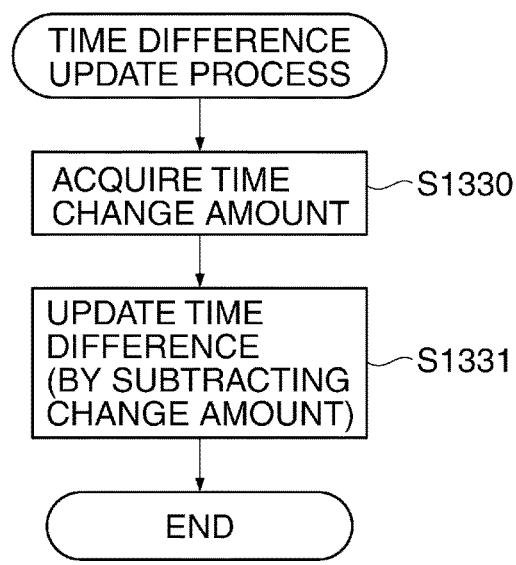
FIG. 19B is a flowchart of a time difference update process.

FIG. 19B is a flowchart of the time difference update process performed in the step S1306 in FIG. 15A. First, in a step S1330, the controller module 402 acquires the time change amount ΔT calculated in the step S1312, from the job management module 403, or reads out the job information held in the RAM 203 to thereby acquire the time change amount ΔT. In the step S1331, the controller module 402 requests the time difference management module 408 to update the time difference dT. In response to this request, the time difference management module 408 subtracts the time change amount ΔT acquired in the step S1330, from the currently managed time difference dT to thereby update the time difference dT. The time change amount ΔT mentioned here is the one that was used to calculate the calculation time cT contained in the time changing job transmitted this time. In a case where the clock time has been changed only once, the time difference dT becomes equal to 0 at this time point. Thereafter, the FIG. 19B process is terminated.

Figure 20:
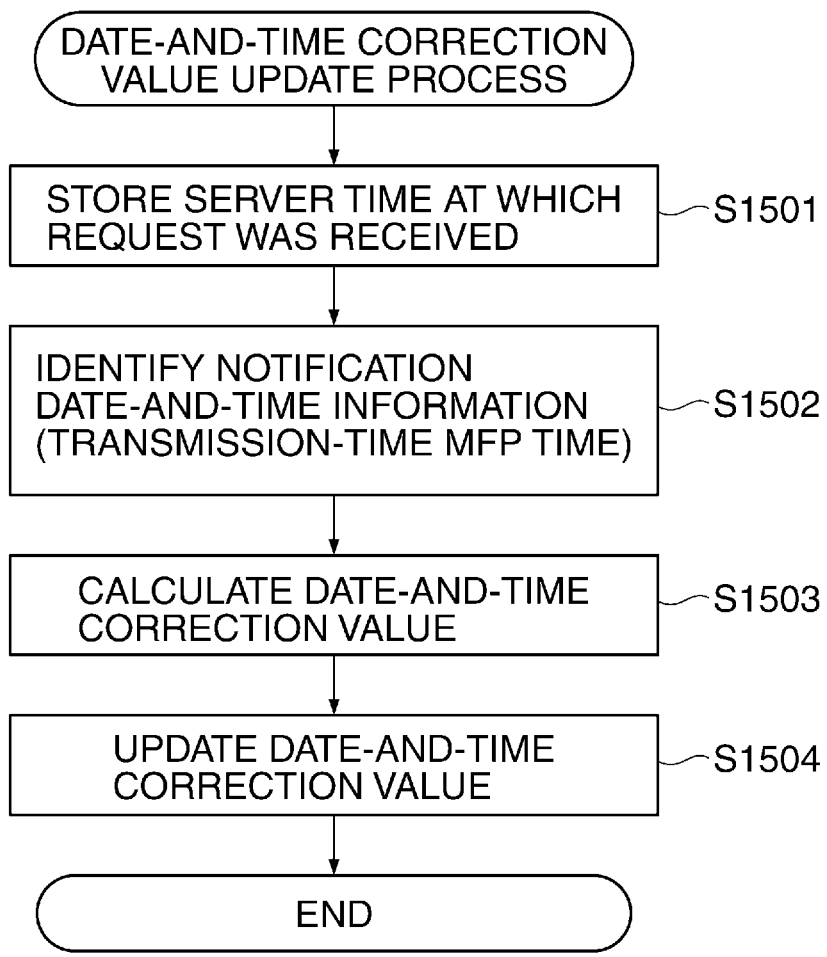
FIG. 20 is a flowchart of a date-and-time correction value update process.

FIG. 20 is a flowchart of the date-and-time correction value update process performed in the step S907 in FIG. 10. When the server application 500 of the server 120 receives the date-and-time correction request from the MFP 110, first, in a step S1501, the controller module 502 identifies a server time (e.g. "2015/01/01 8:30") which is date-and-time information at the time of receiving the date-and-time correction request. In a step S1502, the controller module 502 identifies the MFP first time T1 at the time of job transmission (e.g. "2015/01/01 9:30") which is notification date-and-time information contained in the request, based on an analysis result from the analysis module 503.

In a step S1503, the controller module 502 determines a date-and-time correction value based on the date-and-time information items identified in the respective steps S1501 and S1502. Specifically, the date-and-time correction value is calculated as "2015/01/01 9:30"−"2015/01/01 8:30"="01:00". In a step S1504, the controller module 502 requests the data processor module 504 to perform date-and-time correction. Then, the data processor module 504 requests the data management module 510 to update the currently managed date-and-time correction value to the value of "01:00" calculated in the step S1503, and the data management module 510 updates the date-and-time correction value, followed by terminating the FIG. 20 process. FIG. 21 shows an example of information under management of the data management module 510, concerning the MFPs 110a and 110b after execution of the update process.

Next, a description will be given, with reference to FIGS. 22 and 23, of an example of processing operation performed when settings are changed or the clock time is changed a plurality of times in a situation where communication with the server is stopped e.g. due to shutdown, and an example of processing operation performed after the communication is resumed.

FIG. 22 is a table showing details of events having occurred in the MFP 110 concerning the data synchronization process, and the clock time of the server 120 and that of the MFP 110 at a time point of occurrence of each event. In the table, "server time" is a time with reference to which the server application 500 operates, as described hereinbefore, and "MFP time" is a time indicated by the clock of the MFP 110. However, when the clock time of the MFP 110 is changed, the MFP time indicates a time after the change. First of all, it is understood that in an initial state shown in a first row of FIG. 22, the MFP time is one hour ahead of the server time. An item "time difference" indicates a difference between a date-and-time correction value stored in the server 120 and a value indicative of an actual difference between a time clocked (indicated) by the clock of the server 120 and a time clocked (indicated) by the clock of the MFP 110. At server time 9:00, since it is assumed to be in the initial state, it is assumed that the time has not been changed yet, and hence the time difference dT is not shown.

At server time 9:00, a situation where the MFP 110 cannot perform communication with the server 120 has occurred due to stoppage of operation of the server 120 or a problem with the network 100 via which the MFP 110 is connected to the server 120. As a consequence, no synchronization requesting job (including a change in settings and a time change) can be transmitted to the server 120 until the server 120 recovers, and hence a job is held as an unprocessed job in the job queue managed by the job management module 403.

At server time 9:10, data assigned ID 0001 in the address book has its name and address updated to AddressA and a@a, respectively, when the MFP time is 10:10. At this time, the time difference dT is equal to 0. At server time 9:20, the clock time of the MFP 110 is corrected (first time change), and the MFP time is advanced from 10:20 to 10:40 by 20 minutes (time change amount ΔT=00:20). At this time, 20 minutes is added to the time difference dT, whereby the time difference dT is updated to 0:20. At server time 9:30, the MFP 110 is restarted. When the MFP 110 is restarted, the count value of the time counter and the snapshot value of the time information (see FIG. 16) held in the RAM 203 are temporarily cleared, and then, these values are acquired again and recorded in the RAM 203 during the restarting of the MFP 110, as time clocking information before the change.

At server time 9:40, data assigned ID 0002 in the address book has its name and address updated to AddressB and b@b, respectively, when the MFP time is 11:00. At server time 9:50, the clock time of the MFP 110 is corrected (second time change), and the MFP time is advanced from 11:10 to 11:40 by 30 minutes (time change amount ΔT=00:30). At this time, 30 minutes is added to the time difference dT, whereby the time difference dT is updated to 0:50. At server time 10:00, the server 120 recovers, and the communication between the MFP 110 and the server 120 is resumed.

Next, a description will be given, with reference to FIG. 23, of processing performed by the data synchronization application 400 of the MFP 110 after the communication between the MFP 110 and the server 120 is resumed. When the communication between the MFP 110 and the server 120 is resumed, the controller module 402 transmits jobs held in the queue of the job management module 403, in the order in which the jobs were input (generated). Note that in actuality, the jobs are sequentially subjected to processing immediately after the communication is resumed, and hence the processing time is very short, but in the following description, it is assumed, for ease of understanding, that each job is transmitted every ten minutes.

In FIG. 23, "server time" has the same meaning as "server time" in FIG. 22, i.e. a time with reference to which the server application 500 operates, and in other words, a time with reference to which the server 120 manages data. "MFP time identified by server" is an MFP time of the MFP 110 recognized by the server 120, which is calculated as "server time"+"date-and-time correction value". In the example illustrated in FIGS. 22 and 23, the server 120 recognizes, before server time 9:00, that the MFP time is one hour ahead of the server time, and holds the recognition until new notification date-and-time information is received. Therefore, at sever time 10:10, 11:10 obtained by adding one hour to the server time is the MFP time recognized by the server 120. "MFP time (job transmission time)" indicates a time indicated by the clock of the MFP 110 at a time point when a job is actually transmitted. In the example described with reference to FIG. 22, at a time point corresponding to the server time 10:10, a time indicated by the clock of the MFP 110 is ahead of the server time by one hour and fifty minutes. An item "job-containing time (generation time)" indicates an MFP time at which the job was generated and input.

At server time 10:10 in FIG. 23, processing of the job concerning changes in values, which was input (generated) at MFP time 10:10 in FIG. 22, is executed. The server 120 analyzes the received job and subtracts a date-and-time correction value of "1:00" from the time 10:10 written as a job generation time in the job, to thereby obtain a time 9:10. Thus, the server 120 recognizes that the job received this time is a job generated at the server time 9:10. In short, at what time point the job was generated with reference to the server time is calculated by "job generation time−date-and-time correction value". The job processed this time is a job input at MFP time 10:10 in FIG. 22, and MFP time 10:10 corresponds to server time 9:10. Therefore, the MFP time is corrected to the proper time (sever time corresponding to MFP time), and the job processing is executed.

Next, at server time 10:20, processing of a first time changing job is executed. At this time point, the job transmission time is MFP time (MFP first time T1) 12:10, the time difference dT is "00:50", and the time change amount ΔT contained in the job is "00:20". Therefore, the controller module 402 calculates the calculation time cT by the equation (1) as "12:10−0:50+0:20=11:40" and notifies the job containing the calculation time cT (11:40) as notification date-and-time information to the server 120. On the other hand, the server 120 analyzes the received job and recognizes, based on the notification date-and-time information written in the job, i.e. the time 11:40, and the current server time 10:20, that the MFP time is ahead of the server time by one hour and twenty minutes (1:20). The data management module 510 of the server 120 stores this value of 1:20 as the date-and-time correction value for the MFP 110. Since the date-and-time correction value is changed from 1:00 to 1:20, the MFP time identified by the server 120 at server time 10:20 is changed from 11:20 to 11:40. When the processing by the server 120 is normally completed, i.e. when notification of the normal completion of the processing is received from the server 120, the MFP 110 subtracts the time change amount ΔT (0:20) used for calculation of the calculation time Ct contained in the transmitted job, from the time difference dT (0:50) to thereby update the time difference dT. Thus, the time difference dT is updated to 0:30.

At server time 10:30 in FIG. 23, processing of the job concerning changes in values, which was input (generated) at MFP time 11:00 in FIG. 22 is executed. The server 120 analyzes the received job and subtracts a date-and-time correction value of 1:20 from the time 11:00 written as a job generation time in the job, to thereby obtain a time 9:40. Thus, the server 120 recognizes that the job received this time is a job generated at server time 9:40. The job processed this time is a job input at MFP time 11:00 in FIG. 22, and the MFP time 11:00 corresponds to the server time 9:40. Therefore, the MFP time is corrected to the proper time (sever time corresponding to MFP time), and the job processing is executed.

Next, at server time 10:40, processing of a second time changing job is executed. As for this job, the job transmission time is MFP time (MFP first time T1) 12:30, the time difference dT is "00:30", and the time change amount ΔT contained in the job is "00:30". Therefore, the controller module 402 calculated the calculation time cT by the equation (1) as 12:30−0:30+0:30=12:30, and notified the job containing the calculation time cT (12:30) as notification date-and-time information to the server 120. On the other hand, the server 120 analyzes the received job and recognizes, based on the notification date-and-time information written in the job, i.e. the time 12:30, and the current server time 10:40, that the MFP time is ahead of the server time by one hour and fifty minutes (1:50). The data management module 510 of the server 120 stores this value of 1:50 as the date-and-time correction value for the MFP 110. Since the date-and-time correction value is changed from 1:20 to 1:50, the MFP time identified by the server 120 at server time 10:40 is changed from 12:00 to 12:30. When the processing by the server 120 is normally completed, i.e. when notification of the normal completion of the processing is received from the server 120, the MFP 110 subtracts the time change amount ΔT (0:30) used for calculation of the calculation time contained in the transmitted job, from the time difference dT (0:30) to thereby update the time difference dT. Thus, the time difference dT is updated to 0:00.

As described above, in a case where the clock time of the MFP 110 is changed, the MFP 110 stores the time change amount ΔT as job information, and calculates the notification date-and-time information from the time difference dT and the time change amount ΔT at a time point of transmission of a job. The server 120 can properly recognize the MFP time at which the job was input, from the notification date-and-time information. Therefore, even when the change of time and/or the change of settings are performed a plurality of times during a time period over which the communication between the MFP 110 and the server 120 is disabled e.g. due to a problem with the network 100, the shutdown of the MFP 110, or the stoppage of the server 120, it is possible to synchronize the settings each with a proper time.

According to the present embodiment, when the clock time of the MFP 110 is changed, the time change amount ΔT is calculated, and then the calculation time cT calculated based on the time difference dT and the time change amount ΔT is notified as notification date-and-time information to the server 120. This makes it possible, even when the clock time of the MFP 110 is changed during a time period over which the communication with the server 120 is disabled, to ensure temporal matching between the MFP 110 and the server 120 after the communication is resumed.

In particular, when a time changing job is generated, the MFP 110 updates the time difference dT by addition of the time change amount ΔT, and after transmission of the job, the MFP 110 updates the time difference dT by subtraction of the time change amount ΔT. This makes it possible, even in the case where the time of the clock is changed a plurality of times during a time period over which the communication with the server 120 is disabled, to ensure temporal matching between the MFP 110 and the server 120 after the communication is resumed.

Next, a description will be given of a second embodiment. In the first embodiment, in the case where the time of the clock is changed in the MFP 110, the calculation time cT is notified as notification date-and-time information to the server 120, whereby a difference in clock time between the server 120 and the MFP 110 is managed. However, even if only a time change amount is notified to the server 120 in timing at which the clock time is changed, it is possible to properly perform synchronization processing. In view of this, in the second embodiment, a configuration is employed in which a time change amount is transmitted in the case where the time of the clock is changed. Therefore, the second embodiment will be described using FIGS. 24A, 24B, and 24C in place of FIGS. 15A, 15B, and 19A, and FIGS. 25 and 26 in place of FIGS. 10 and 20. FIG. 19B will not be used. The other configuration than the above is the same as that according to the first embodiment. Incidentally, in the second embodiment, it is not necessary to use the time difference management module 408, and hence the time difference management module 408 may be omitted from the configuration of the MFP 110 (shown in FIG. 4).

Figure 24A:
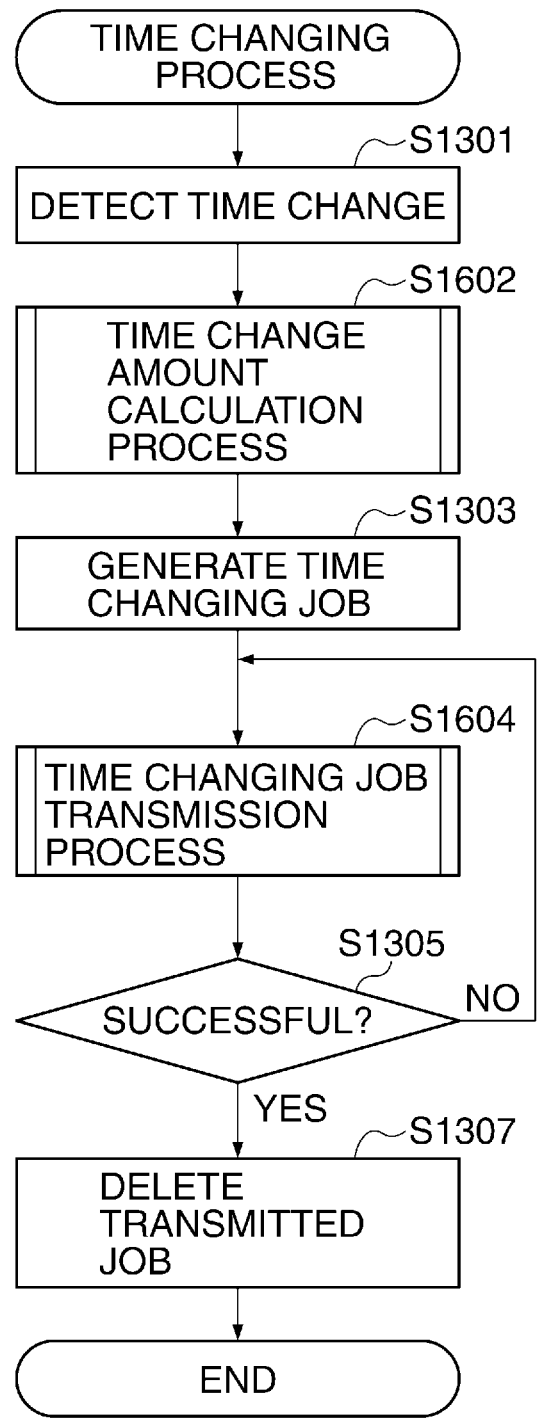
FIG. 24A is a flowchart of a time changing process.

FIG. 24A is a flowchart of a time changing process performed by the MFP 110. This process is performed when the clock time of the MFP 110 is changed (corrected). Steps appearing in FIG. 24A are realized by the CPU 202 executing the data synchronization application 400 and the data management application 410 stored in one of the RAM 203, the HDD 205, and the ROM 206 of the MFP 110. Note that in each of steps in FIG. 24A to FIG. 24C, denoted by the same step numbers as those in FIGS. 15A, 15B, and 19A, the same processing as in the first embodiment is performed. Hereafter, basically, processing in different steps from those in the first embodiment will be described.

In FIG. 24A, the step S1306 appearing in FIG. 15A is omitted, and steps S1602 and S1604 are provided in place of the steps S1302 and S1304. In the step S1602, the controller module 402 performs a time change amount calculation process (described hereinafter with reference to FIG. 24B) and causes the change amount calculation module 406 to calculate a change amount (time change amount ΔT) between clock times before and after the time change. Then, in the step S1604, the controller module 402 performs a time changing job transmission process (described hereinafter with reference to FIG. 24C).

FIG. 24B is a flowchart of the time change amount calculation process performed in the step S1602 in FIG. 24A. The FIG. 24B process is the same as the FIG. 15B process except that the step S1314 appearing in FIG. 15B is omitted. FIG. 24C is a flowchart of the time changing job transmission process performed in the step S1604 in FIG. 24A. In FIG. 24C, the steps S1320 and S1321 appearing in FIG. 19A are omitted, and steps S1623 and S1624 are provided in place of the steps S1323 and S1324.

In the step S1623, the controller module 402 sets the time change amount ΔT acquired in the step S1322 in the notification time generation module 407, as "notification date-and-time information" without changing the same. In the step S1624, the controller module 402 adds the time change amount ΔT as notification date-and-time information to the time changing job and requests the communication processor module 404 to perform transmission of the job. The communication processor module 404 performs transmission of the job to thereby notify the time change amount ΔT to the server 120. Thereafter, the FIG. 24C process is terminated. Note that in a case where the job cannot be transmitted in the step S1624, i.e. in a case where notification of the completion of processing of the job is not received from the server 120, the job is stored as unprocessed job in a queue managed by the job management module 403, and the processing for transmission thereof is performed again after the lapse of a predetermined time period. The order of transmission corresponds to the order of job generation.

Figure 25:
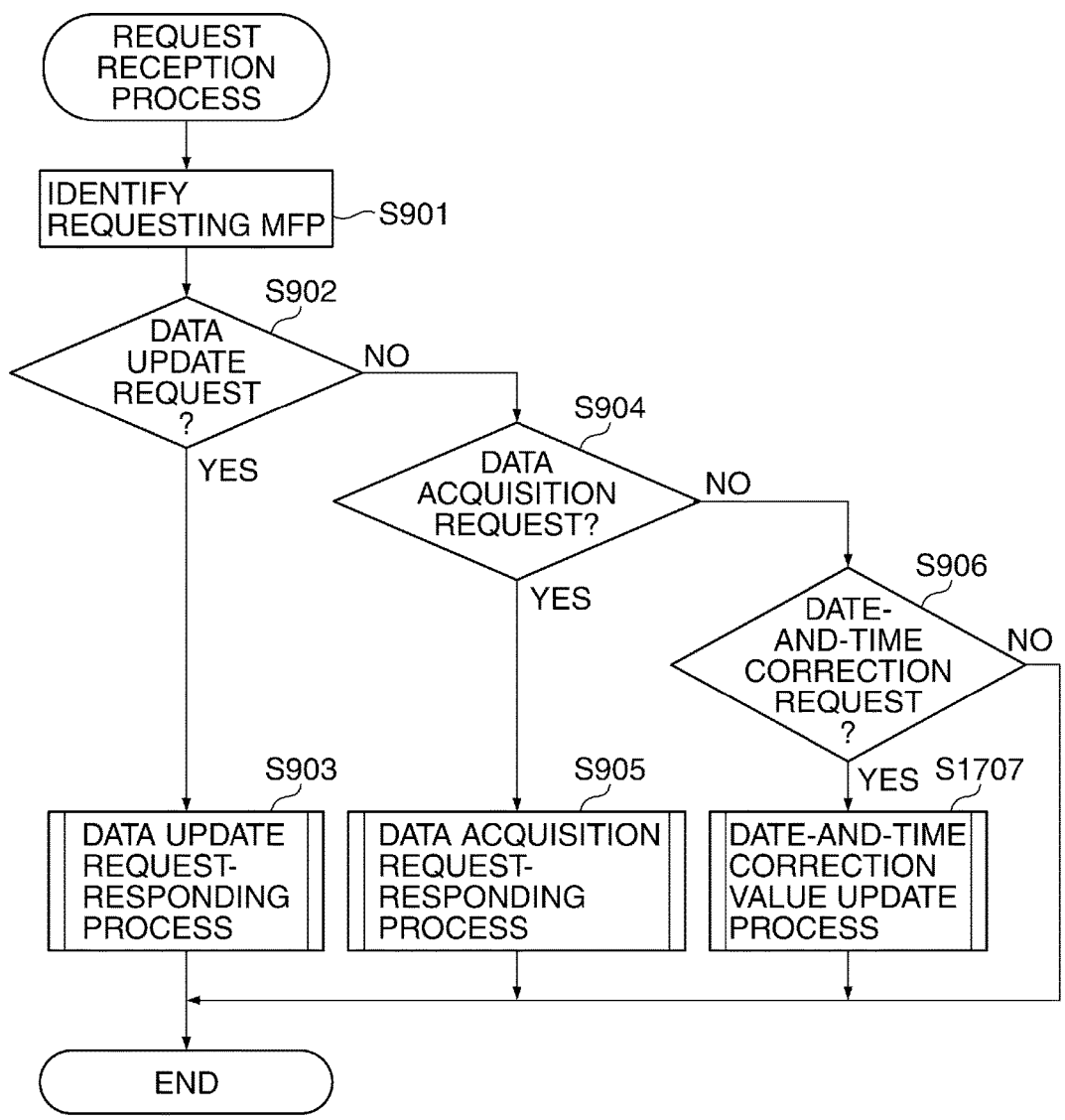
FIG. 25 is a flowchart of a request reception process.

FIG. 25 is a flowchart of a request reception process performed by the server 120. This process is started when the server 120 receives a synchronization job of a data update request, a data acquisition request, or a date-and-time correction request. The present process is realized by the CPU 301 executing the server application 500. In the following description, each module of the server application 500 executed by the CPU 301 will be described as a processing entity. Note that in FIG. 25, a step S1707 is provided in place of the step S908 in FIG. 10. The processing in the other steps is the same as in the first embodiment.

Figure 26:
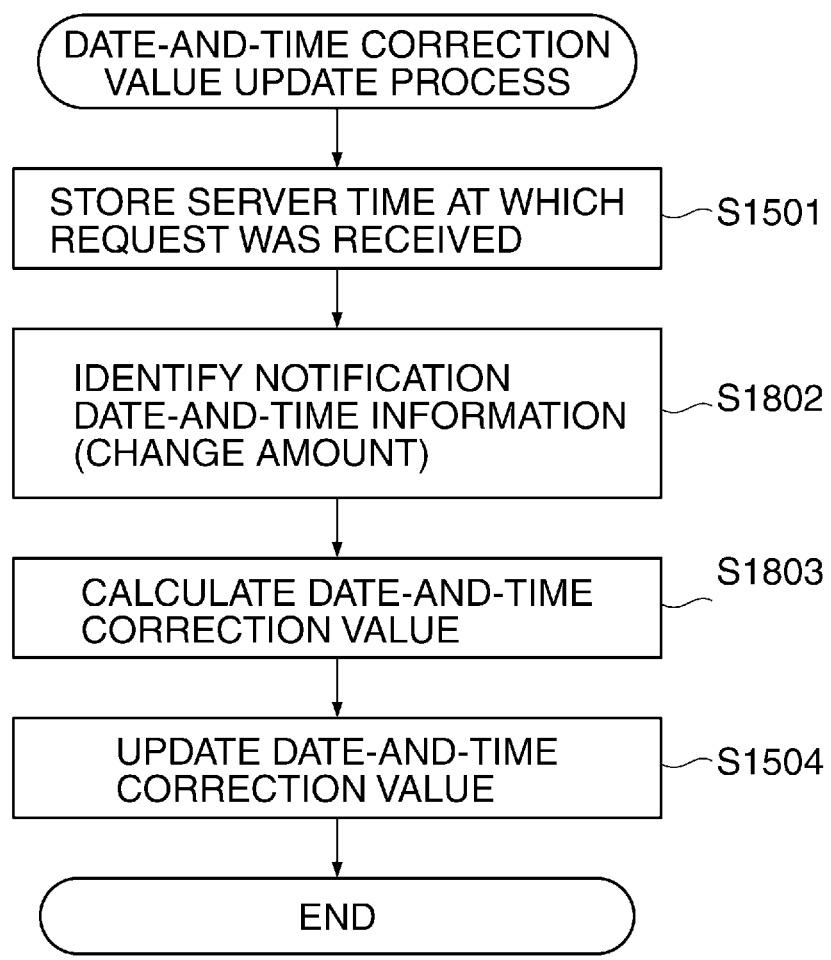
FIG. 26 is a flowchart of a date-and-time correction value update process.

Note that in each of steps in FIGS. 25 and 26, denoted by the same step numbers as those in FIGS. 10 and 20, the same processing as the first embodiment is performed. Hereafter, basically, processing in different steps from those in the first embodiment will be described. In the step S1707, a date-and-time correction value update process (described hereinafter with reference to FIG. 26) is performed, followed by terminating the FIG. 25 process.

FIG. 26 is a flowchart of the date-and-time correction value update process performed in the step S1707 in FIG. 25. Note that in FIG. 26, steps S1802 and S1803 are provided in place of the steps S1502 and S1503 in FIG. 20.

In the step S1802, the controller module 502 identifies the time change amount ΔT (e.g. "01:00") as notification date-and-time information contained in the request, based on a result of analysis by the analysis module 503. The time change amount ΔT of "01:00" identified here has a plus sign, and hence in order to identify an actual clock time of the MFP 110, it is required to add one hour to the date-and-time correction value currently managed by the data management module 510 of the server 120 in association with the MFP 110.

In the step S1803, the data processor module 504 acquires the current date-and-time correction value from the data management module 510, and adds the time change amount ΔT of "01:00" identified in the step S1802 to the current date-and-time correction value to thereby calculate a new date-and-time correction value. In the step S1504, the controller 502 requests the data processor module 504 to perform date-and-time correction. In response to this request, the data processor module 504 requests the data management module 510 to update the current date-and-time correction value to the new date-and-time correction value calculated in the step S1803, and the data management module 510 updates the date-and-time correction value in the step S1504, followed by terminating the FIG. 26 process. Assuming that the FIG. 26 process concerns the MFP 110a, information under the management of the data management module 510 in association with the MFP 110a and the MFP 110b is updated from that shown in FIG. 21 before execution of the update processing to that shown in FIG. 27 after execution of the update processing.

As described above, in a case where the clock time of the MFP 110 is changed, the MFP 110 stores the notification date-and-time information, i.e. the time change amount ΔT, as job information, and notifies the time change amount ΔT to the server 120. The server 120 adds the time change amount ΔT directly to the date-and-time correction value managed by the data management module 510, to thereby update the date-and-time correction value. This makes it possible for the server 120 to properly recognize the MFP time at which the job was input, from the date-and-time correction value and the server time. Therefore, the second embodiment provides the same advantageous effect as provided by the first embodiment in that even when the clock time of the MFP 110 is changed a plurality of times during a time period over which the communication with the server 120 is disabled, it is possible to ensure temporal matching between the MFP 110 and the server 120 after the communication is resumed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-231954 filed Nov. 27, 2015 which is hereby incorporated by reference herein in its entirety.

What is claimed is:

1. An information processing apparatus that communicates with a server, comprising:
a memory device that stores a set of instructions; and
at least one processor that executes the instructions to:
notify notification date-and-time information to the server in a case where predetermined processing is performed;
calculate a single change amount in the time of the clock in a case where the time of the clock is changed; and
manage a total change amount in the time of the clock, which indicates a time difference between a current time defined based on the notification date-and-time information notified to the server and a current time indicated by a clock of the information processing apparatus,
wherein the at least one processor further executes the instructions to:
calculate, in the case where the time of the clock is changed, a calculation time based on the total change amount and the single change amount; and
notify the calculated calculation time as the notification date-and-time information to the server,
wherein the time indicated by the clock is notified to the server at time points when the information processing apparatus is initially connected to the server, when the information processing apparatus is started up, when the information processing apparatus recovers from sleep, or when the information processing apparatus is restarted after temporary stoppage.

2. The information processing apparatus according to claim 1, wherein the at least one processor further executes the instructions to:
generate, in the case where the time of the clock is changed, a job containing the calculated calculation time; and
transmit the generated job to the server.

3. The information processing apparatus according to claim 2, wherein the at least one processor further executes the instructions to:
subtract, in the case where the time of the clock is changed, the time difference from a time indicated by the clock when the job is transmitted; and
add the change amount to the time, to thereby calculate the calculation time.

4. The information processing apparatus according to claim 2, wherein the at least one processor further executes the instructions to:
add, when the job is generated, the change amount to the time difference to thereby update the time difference.

5. The information processing apparatus according to claim 4, wherein the at least one processor further executes the instructions to:

subtract, after transmission of the job, the change amount used for calculation of the calculation time contained in the transmitted job from the time difference to thereby update the time difference.

6. The information processing apparatus according to claim 1, wherein the at least one processor further executes the instructions to:
transmit a job that could not be transmitted, after it becomes possible to transmit the job.

7. The information processing apparatus according to claim 1, wherein the at least one processor further executes the instructions to:
calculate the amount of change in the time of the clock based on a time clocked by a time clocking device independent of the clock and a time clocked by the clock.

8. An information processing system including:
an information processing apparatus; and
a server that communicates with the information processing apparatus,
wherein the information processing apparatus comprises:
a memory device that stores a set of instructions; and
at least one processor that executes the instructions to:
notify notification date-and-time information to the server in a case where predetermined processing is performed;
calculate a single change amount in the time of the clock in a case where the time of the clock is changed; and
manage a total change amount in the time of the clock, which indicates a time difference between a current time defined based on the notification date-and-time information notified to the server and a current time indicated by a clock of the information processing apparatus,
wherein the at least one processor further executes the instructions to:
calculate, in the case where the time of the clock is changed, a calculation time based on the total change amount and the single change amount; and
notify the calculated calculation time as the notification date-and-time information to the server,
wherein the time indicated by the clock is notified to the server at time points when the information processing apparatus is initially connected to the server, when the information processing apparatus is started up, when the information processing apparatus recovers from sleep, or when the information processing apparatus is restarted after temporary stoppage.

9. The information processing system according to claim 8, wherein the at least one processor further executes the instructions to:
calculate the amount of change in the time of the clock based on a time clocked by a time clocking device independent of the clock and a time clocked by the clock.

10. A method of controlling an information processing apparatus that communicates with a server, comprising:
notifying notification date-and-time information to the server in a case where predetermined processing is performed;
calculating a single change amount in the time of the clock in a case where the time of the clock is changed; and
managing a total change amount in the time of the clock, which indicates a time difference between a current time defined based on the notification date-and-time information notified to the server and a current time indicated by a clock of the information processing apparatus,
wherein said calculating includes, in the case where the time of the clock is changed, calculating a calculation time based on the total change amount and the single change amount,
wherein said notifying includes notifying the calculated calculation time as the notification date-and-time information to the server, and
wherein the time indicated by the clock is notified to the server at time points when the information processing apparatus is initially connected to the server, when the information processing apparatus is started up, when the information processing apparatus recovers from sleep, or when the information processing apparatus is restarted after temporary stoppage.

11. A non-transitory computer-readable storage medium storing a computer-executable program for executing a method of controlling an information processing apparatus that communicates with a server,
wherein the method comprises:
notifying notification date-and-time information to the server in a case where predetermined processing is performed;
calculating a single change amount in the time of the clock in a case where the time of the clock is changed; and
managing a total change amount in the time of the clock, which indicates a time difference between a current time defined based on the notification date-and-time information notified to the server and a current time indicated by a clock of the information processing apparatus,
wherein said calculating includes, in the case where the time of the clock is changed, calculating a calculation time based on the total change amount and the single change amount,
wherein said notifying includes notifying the calculated calculation time as the notification date-and-time information to the server, and
wherein the time indicated by the clock is notified to the server at time points when the information processing apparatus is initially connected to the server, when the information processing apparatus is started up, when the information processing apparatus recovers from sleep, or when the information processing apparatus is restarted after temporary stoppage.

* * * * *